United States Patent
Matsuoka

(10) Patent No.: US 10,205,928 B2
(45) Date of Patent: Feb. 12, 2019

(54) IMAGE PROCESSING APPARATUS THAT ESTIMATES DISTANCE INFORMATION, METHOD OF CONTROLLING THE SAME, AND STORAGE MEDIUM

(71) Applicant: CANON KABUSHIKI KAISHA, Tokyo (JP)

(72) Inventor: Masaaki Matsuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 669 days.

(21) Appl. No.: 13/910,644

(22) Filed: Jun. 5, 2013

(65) Prior Publication Data
US 2013/0329019 A1 Dec. 12, 2013

(30) Foreign Application Priority Data

Jun. 7, 2012 (JP) ................................ 2012-129865

(51) Int. Cl.
*H04N 13/02* (2006.01)
*H04N 13/218* (2018.01)
(Continued)

(52) U.S. Cl.
CPC ........... *H04N 13/218* (2018.05); *G06T 7/571* (2017.01); *G06T 7/593* (2017.01);
(Continued)

(58) Field of Classification Search
CPC . G06T 2207/10012; G06T 2207/10148; G06T 2207/20221; G06T 7/0069; H04N 13/0217
(Continued)

(56) References Cited

U.S. PATENT DOCUMENTS 5,019,852 A * 5/1991 Yamamoto ............. G03B 17/20
396/147

6,148,120 A * 11/2000 Sussman ............ G06K 9/00201
382/293

(Continued)

FOREIGN PATENT DOCUMENTS

| JP | 06-074762 A | 3/1994 | |
| JP | 2010-183174 A | 8/2010 | |
| JP | WO 2011158581 A1 * | 12/2011 | .............. C08L 91/00 |

OTHER PUBLICATIONS

Rajagopalan, A. N., Subhasis Chaudhuri, and Uma Mudenagudi. "Depth estimation and image restoration using defocused stereo pairs." IEEE Transactions on Pattern Analysis and Machine Intelligence 26.11 (2004): 1521-1525.*

Gary Bradski, et al., "Learning OpenCV". Oreilly & Associates, Inc. pp. 377-467. Oct. 3, 2008.

*Primary Examiner* — Tat C Chio
*Assistant Examiner* — Fabio S Lima
(74) *Attorney, Agent, or Firm* — Rossi, Kimms & McDowell LLP

(57) ABSTRACT

An image processing apparatus free from the inconvenience of an increase in the number of focal positions for image pickup or reduction of the distance accuracy. An optical imaging system forms an object image and an image pickup device picks up the formed object image. A first range image is generated from a plurality of images picked up by the image pickup device and having parallax. A second range image is generated from a plurality of images picked up by the image pickup device and having different degrees of focus at respective corresponding locations therein. A synthesis coefficient is calculated according to the depth of field of a main object selected from objects shown in the object image. A synthesized range image is generated by synthesizing the generated first range image and second range image using the calculated synthesis coefficient.

20 Claims, 20 Drawing Sheets

(51) Int. Cl.
*G06T 7/571* (2017.01)
*G06T 7/593* (2017.01)

(52) U.S. Cl.
CPC ............ *G06T 2207/10012* (2013.01); *G06T 2207/10148* (2013.01); *G06T 2207/20221* (2013.01)

(58) Field of Classification Search
USPC ............................................ 348/49; 382/106
See application file for complete search history.

(56) References Cited

U.S. PATENT DOCUMENTS

| | | | | |
|---|---|---|---|---|
| 8,937,644 | B2* | 1/2015 | Tin | H04N 13/0018 345/419 |
| 2008/0106620 | A1* | 5/2008 | Sawachi | H04N 13/0257 348/262 |
| 2009/0174792 | A1* | 7/2009 | Kusaka | H04N 5/235 348/230.1 |
| 2009/0310885 | A1* | 12/2009 | Tamaru | H04N 5/2356 382/275 |
| 2012/0148109 | A1* | 6/2012 | Kawamura | G01C 3/06 382/106 |
| 2012/0293627 | A1* | 11/2012 | Ishii | H04N 13/0011 348/46 |
| 2015/0281540 | A1* | 10/2015 | Matsuoka | H04N 5/2355 348/362 |

* cited by examiner

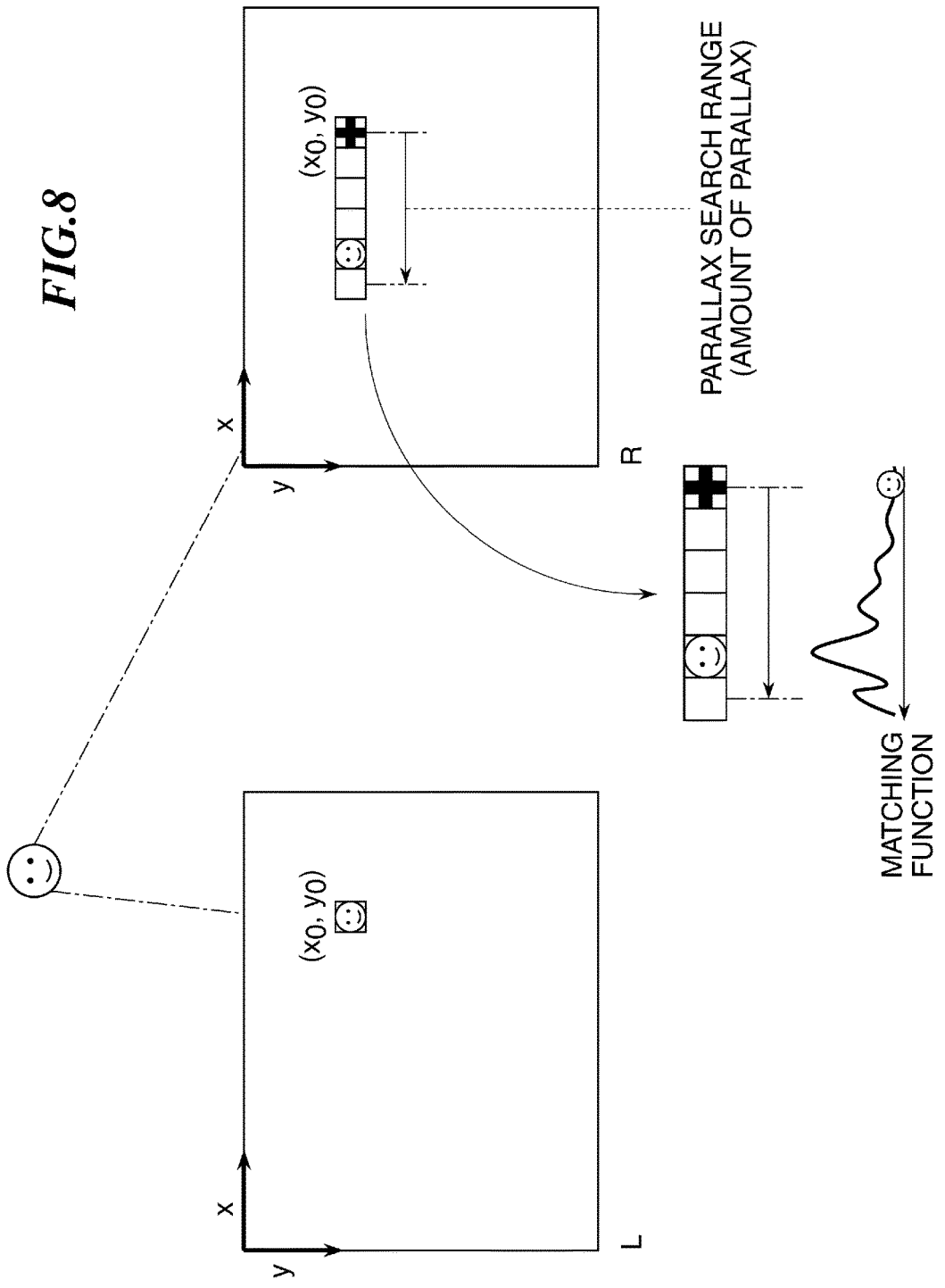

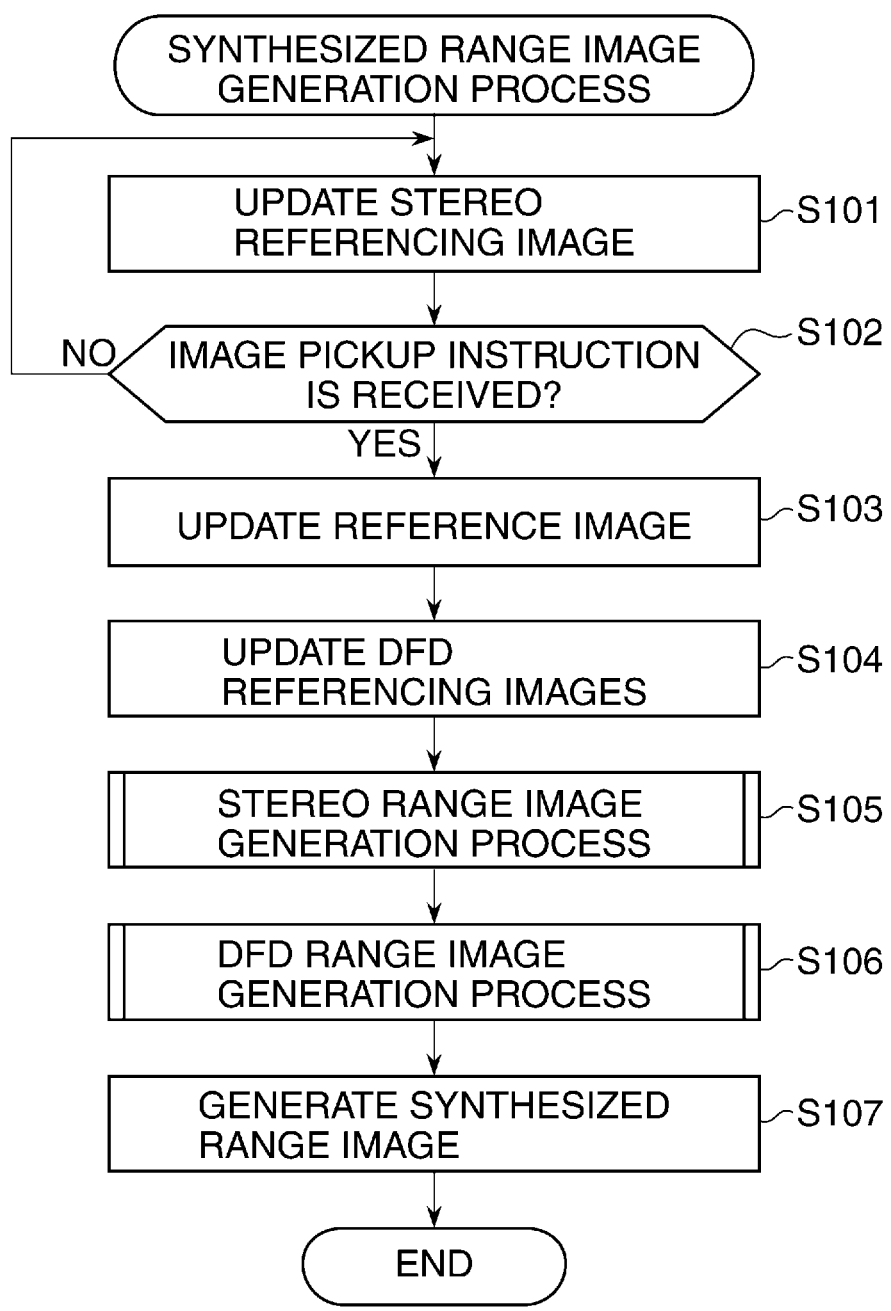

IMAGE PROCESSING APPARATUS THAT ESTIMATES DISTANCE INFORMATION, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Conventionally, in the field of computer vision and the like, it is demanded to obtain distance information from a picked-up image.

For example, there has been disclosed a technique for estimating distance information by searching for correspondence points from a plurality of images having parallax, using the correlation between them (see e.g. Japanese Patent Laid-Open Publication No. H06-74762, and "Learning OpenCV" by Gary Bradski and Adrian Kaehler), Oreilly & Associates Inc. (Oct. 3, 2008)).

Further, there has been disclosed a technique for estimating distance information by calculating an amount of change in the degree of focus from a plurality of images which are different in focal position (see e.g. Japanese Patent Laid-Open Publication No. 2010-183174).

Japanese Patent Laid-Open Publication No. H06-74762 further discloses a technique in which distance information estimation is performed, so to accurately estimate distance information even with respect to an object which is out of the depth of field of an optical imaging system, by picking up images in a plurality of focal positions to thereby prevent such an object from being out of the depth of field.

FIG. 21 is a diagram useful in explaining a plurality of focal positions. In FIG. 21, a distance measurement device 9117 picks up a plurality of images having parallax therebetween. The depth of field of an optical imaging system of the distance measurement device 9117 is calculated by the following equations (1) to (3):

$$D_f = \frac{r \cdot Av \cdot Z^2}{f^2 + r \cdot Av \cdot Z} \quad (1)$$

$$D_b = \frac{r \cdot Av \cdot Z^2}{f^2 - r \cdot Av \cdot Z} \quad (2)$$

$$D = D_f + D_b \quad (3)$$

wherein $D_f$ represents front depth of field, $D_b$ represents rear depth of field, D represents depth of field, r represents a diameter of a permissible circle of confusion, Av represents an aperture value, Z represents an object distance, and f represents a focal length.

For example, let it be assumed that the diameter of the permissible circle of confusion is 0.03328 mm, the aperture value is set to 2.8, and the focal length is set to 50 mm, and that a plurality of focal positions are determined such that there is no object which is out of the depth of field within a range of distance of 1 m to 20 m. At this time, the ranges of the depth of field corresponding to the respective focal positions are indicated by arrows shown in FIG. 21 from the above equations (1) and (2). The arrows in FIG. 21, denoted by reference numerals 9101 to 9116, indicate boundaries between the respective ranges of the depth of field.

However, in the conventional technique disclosed in Japanese Patent Laid-Open Publication No. H06-74762, the number of focal positions for distance measurement is increased depending on the aperture value of the optical imaging system of the distance measurement device or the distance range of distance measurement, causing an increase in processing time.

For example, in a case where the number of focal positions for distance measurement is fifteen as in an example shown in FIG. 21, the conventional technique is unsuitable for an apparatus which is required to have immediacy, such as a digital camera.

Further, the conventional technique disclosed in "Learning OpenCV" by Gary Bradski and Adrian Kaehler, Oreilly & Associates Inc. (Oct. 3, 2008) cannot accurately estimate distance information with respect to an object which is out of the depth of field of the optical imaging system.

Further, in the conventional technique disclosed in Japanese Patent Laid-Open Publication No. 2010-183174, the depth of field increases depending on the aperture value of the optical imaging system of the distance measurement device or the distance range of distance measurement, and an amount of change in the degree of focus dependent on a difference in focal position is reduced, which reduces the accuracy of distance.

SUMMARY OF THE INVENTION

The present invention provides an image processing apparatus free from the inconvenience of an increase in the number of focal positions for image pickup or reduction of the distance accuracy, which could be caused by the influence of an aperture value of an optical imaging system or a distance measurement range, a method of controlling the image processing apparatus, and a storage medium.

In a first aspect of the present invention, there is provided an image processing apparatus comprising an imaging optical unit configured to form an object image, an image pickup unit configured to pick up an object image formed by the imaging optical unit, a first range image generation unit configured to generate a first range image from a plurality of images picked up by the image pickup unit and having parallax, a second range image generation unit configured to generate a second range image from a plurality of images picked up by the image pickup unit and having different degrees of focus at respective corresponding locations therein, a calculation unit configured to calculate a synthesis coefficient according to depth of field of a main object selected from a plurality of objects shown in the object image, and a generation unit configured to generate a synthesized range image by synthesizing the first range image generated by the first range image generation unit and the second range image generated by the second range image generation unit using the synthesis coefficient calculated by said calculation unit.

In a second aspect of the present invention, there is provided a method of controlling an image processing apparatus including an imaging optical unit configured to form an object image and an image pickup unit configured to pick up an object image formed by the imaging optical unit, comprising generating a first range image from a plurality of images picked up by the image pickup unit and having parallax, generating a second range image from a plurality of images picked up by the image pickup unit and having different degrees of focus at respective corresponding locations therein, calculating a synthesis coefficient according to depth of field of a main object selected from a plurality of objects shown in the object image, and generating a synthesized range image by synthesizing the generated first range image and the generated second range image using the calculated synthesis coefficient.

In a third aspect of the present invention, there is provided a non-transitory computer-readable storage medium storing a computer-executable program for executing a method of controlling an image processing apparatus including an optical imaging unit configured to form an object image and an image pickup unit configured to pick up an object image formed by the imaging optical unit, wherein the method comprises generating a first range image from a plurality of images picked up by the image pickup unit and having parallax, generating a second range image from a plurality of images picked up by the image pickup unit and having different degrees of focus at respective corresponding locations therein, calculating a synthesis coefficient according to depth of field of a main object selected from a plurality of objects shown in the object image, and generating a synthesized range image by synthesizing the generated first range image and the generated second range image using the calculated synthesis coefficient.

According to the present invention, it is possible to provide an image processing apparatus free from the inconvenience of an increase in the number of focal positions for image pickup or reduction of the distance accuracy, which could be caused by the influence of an aperture value of an optical imaging system or a distance measurement range, a method of controlling the image processing apparatus, and a storage medium.

Further features of the present invention will become apparent from the following description of exemplary embodiments with reference to the attached drawings.

BRIEF DESCRIPTION OF THE DRAWINGS

FIGS. 3A and 3B are diagrams each showing a graph used for determining a synthesis coefficient with respect to the depth of field, in which FIG. 3A shows a graph used for determining the synthesis coefficient such that a value thereof continuously varies, and FIG. 3B shows a graph used for determining the synthesis coefficient such that one of two values is used.

FIG. 8 is a diagram useful in explaining a block matching method employed in stereo correspondence point search.

FIG. 9 is a flowchart of a synthesized range image generation process executed by a system controller appearing in FIG. 1.

DESCRIPTION OF THE EMBODIMENTS

The present invention will now be described in detail below with reference to the accompanying drawings showing embodiments thereof.

Figure 1:
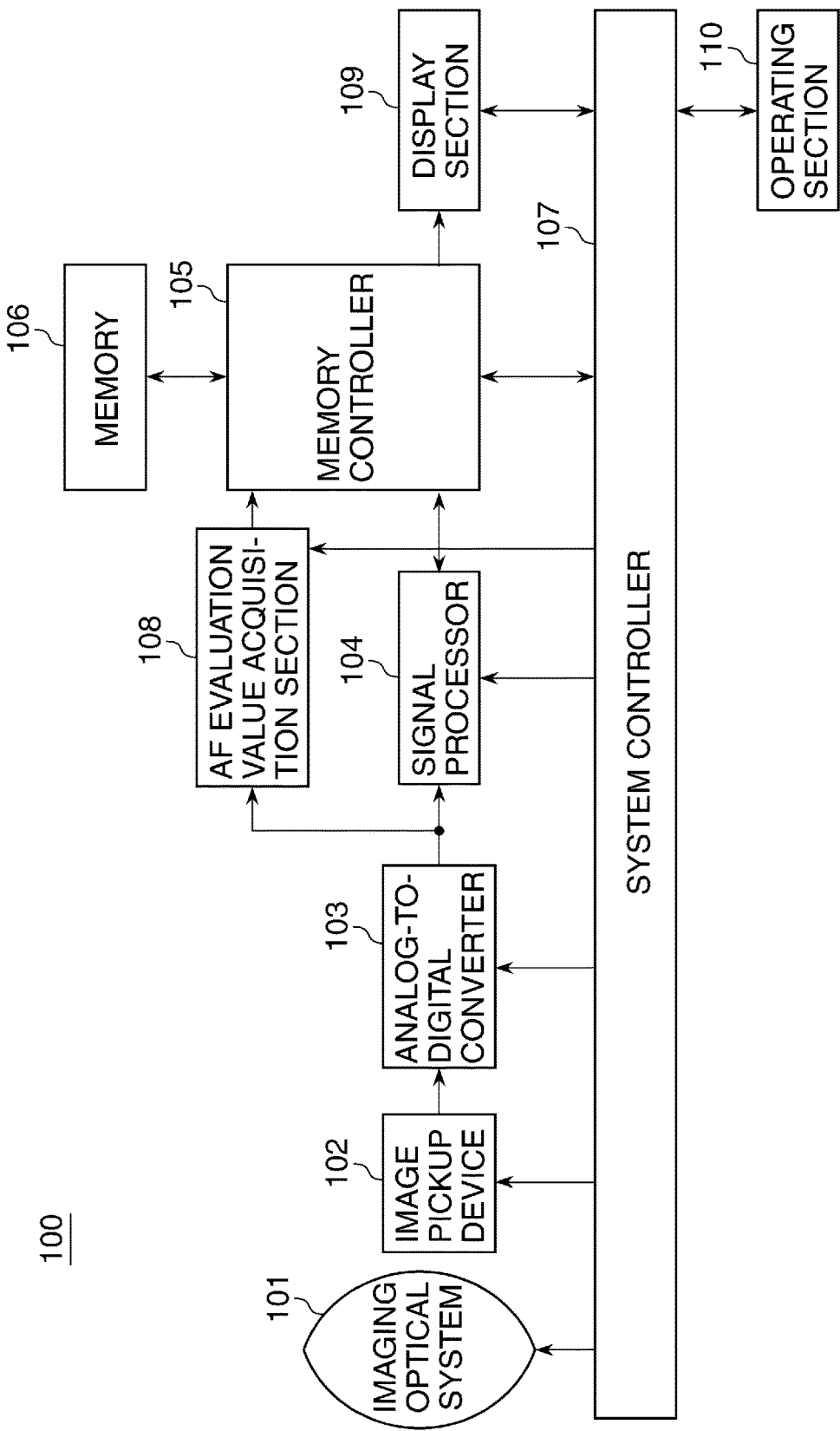
FIG. 1 is a schematic diagram of an image processing apparatus according to embodiments of the present invention.

FIG. 1 is a schematic diagram of an image processing apparatus 100 according to embodiments of the present invention.

In FIG. 1, an imaging optical system 101 comprises a lens, a diaphragm, and so on, and performs focus adjustment and focal length adjustment. An image pickup device 102 converts an optical image into an electric signal. For example, a CCD is used as the image pickup device 102. The imaging optical system 101 corresponds to an imaging optical unit that optically forms an object image. Further, the image pickup device 102 corresponds to an image pickup unit configured to pick up an object image formed by the imaging optical unit.

An analog-to-digital converter 103 converts an analog image signal output from the image pickup device 102 to a digital image signal. A signal processor 104 performs signal processing on the digital image signal output from the analog-to-digital converter 103.

A display section 109 displays an image picked up by the image pickup device 102, and the like. An AF evaluation value acquisition section 108 acquires an AF evaluation value for auto focus (AF) adjustment of the imaging optical system 101. A memory controller 105 stores or reads image signal data and the like in or from a memory (e.g. DRAM) 106.

An operating section 110 receives instructions from a user. A system controller 107 controls the overall operation of the image processing apparatus 100.

In the image processing apparatus 100 configured as above, to achieve focus adjustment of the imaging optical system 101 by auto focus, it is only required to use a technique of a hill climbing contrast AF, which is generally well known.

More specifically, an object light flux having passed through the imaging optical system 101 is received by the image pickup device 102, and focus adjustment is performed such that a contrast (AF evaluation value) of an image pickup output becomes maximum within an area designated as an AF distance measurement frame, whereby it is possible to achieve auto focus.

Further, it is possible to determine a distance Z from a focal position of the imaging optical system 101 subjected to the focus adjustment to an object in focus within the AF distance measurement frame.

Figure 2:
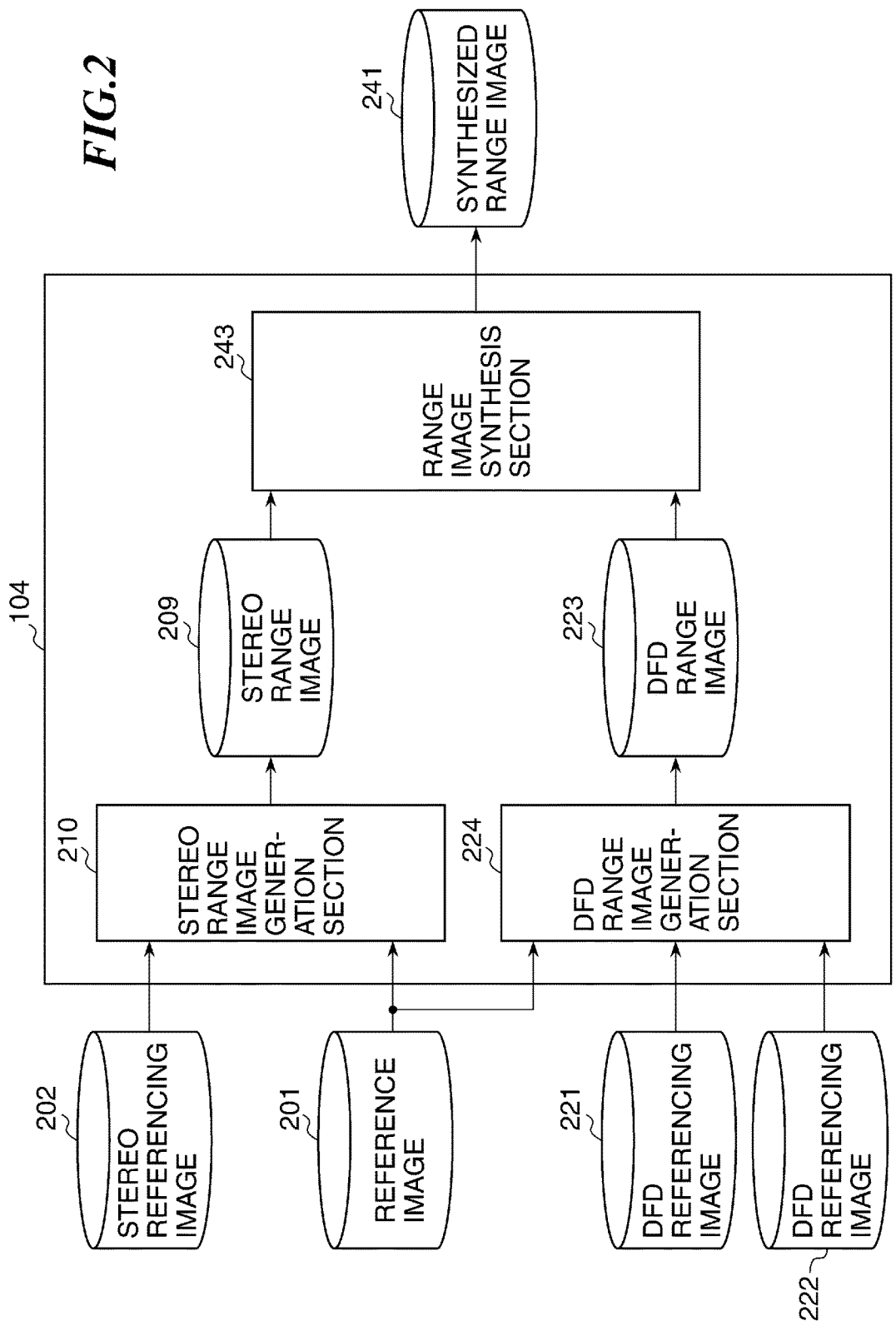
FIG. 2 is a schematic diagram of a signal processor appearing in FIG. 1.

FIG. 2 is a schematic diagram of the signal processor 104 appearing in FIG. 1.

In FIG. 2, a reference image 201 is an image which a stereo range image generation section 210 and a DFD (depth from defocus) range image generation section 224 refer to. Further, a stereo referencing image 202 is an image which the stereo range image generation section 210 refers to, and this image has parallax with respect to the reference image 201.

DFD referencing images 221 and 222 are images which the DFD range image generation section 224 refers to, and these images are picked up at a focal position different from that of the reference image 201.

The stereo range image generation section 210 estimates distance information by searching a plurality of images having parallax for correspondence points using correlation therebetween to thereby generate a stereo range image 209.

The DFD range image generation section 224 estimates distance information by calculating an amount of change in the degree of focus from a plurality of images which are different in focal position to thereby generate a DFD range image 223.

A range image synthesis section 243 synthesizes the stereo range image (first range image) 209 and the DFD range image (second range image) 223 to thereby generate a synthesized range image 241.

In the range image synthesis section 243, image synthesis is performed by using the following equation (4):

$$Z_{MIX}(x,y)=K \cdot Z_{STR}(x,y)+(1-K) \cdot Z_{DFD}(x,y) \quad (4)$$

wherein (x, y) represents a pixel location, $Z_{MIX}(x, y)$ represents a pixel value at (x, y) in the synthesized range image, $Z_{STR}(x, y)$ represents a pixel value at (x, y) in the stereo range image, $Z_{DFD}(x, y)$ represents a pixel value at (x, y) in the DFD range image, and K represents a synthesis coefficient.

The range image synthesis section 243 selects an object brought into focus by contrast AF, as a main object, and determines the synthesis coefficient K according to the depth of field of the main object.

For example, assuming that the diameter of a permissible circle of confusion is 0.03328 mm, the aperture value is set to 2.8, the focal length is set to 50 mm, and an object distance to the main object is 9 m, the depth of field is 6.80 m from the equations (1) to (3). Similarly, assuming that the object distance to the main object is 1 m, the depth of field is 0.075 m. Thus, first, the synthesis coefficient is calculated according to the depth of field of the main object selected from a plurality of objects shown in the object image. Then, the first range image and the second range image are synthesized using the calculated synthesis coefficient to thereby generate a synthesized range image.

Further, the synthesis coefficient K is a coefficient which monotonically increases as the depth of field of a main object increases. As expressed by the equation (4), an image is generated as a synthesized range image, by setting a weighted-average value of respective pixel values of a pixel in the stereo range image and a pixel in the DFD range image, corresponding to respective locations (x, y) in the stereo range image and the DFD range image, as a new pixel value. The synthesis coefficient K in the weighted averaging is a weight factor for a pixel value of the stereo range image.

Further, a weight coefficient (1-K) for a pixel value of the DFD range image monotonically decreases as the synthesis coefficient K increases.

Note that the above-mentioned monotonic increase is sometimes referred to as "a monotonic increase in the broad sense of the term" or "a monotonic non-decrease", depending on the book. Similarly, a monotonic decrease is sometimes referred to as "a monotonic decrease in the broad sense of the term" or "a monotonic non-increase", depending on the book.

Figure 3B:
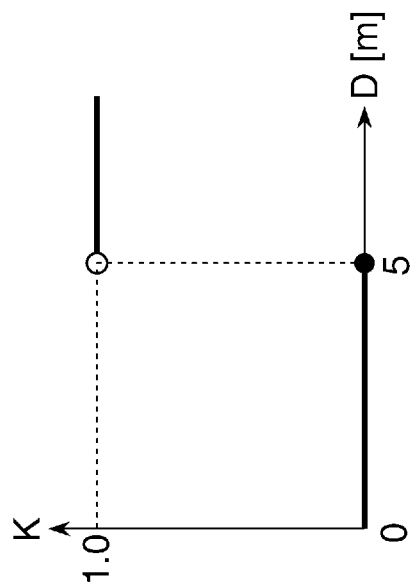
Figure 3A:
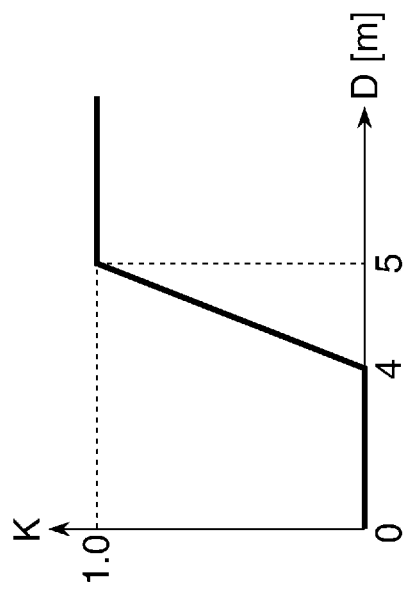

FIGS. 3A and 3B are diagrams each showing a graph for determining a synthesis coefficient with respect to the depth of field D, in which FIG. 3A shows a graph used for determining the synthesis coefficient such that a value thereof continuously varies, and FIG. 3B shows a graph used for determining the synthesis coefficient such that one of two values is used.

In FIGS. 3A and 3B, for example, when the depth of field of the main object is 6.80 m, the synthesis coefficient is equal to 1.0, so that from the equation (4), the synthesized range image is formed preferentially by the stereo range image. Further, when the depth of field of the main object is 0.075 m, the synthesis coefficient is equal to 0.0, so that the synthesized range image is formed preferentially by the DFD range image from the equation (4).

Further, in FIG. 3A, when the depth of field is within a range of 4.0 m to 5.0 m, the preference is gradually shifted from the DFD range image to the stereo range image.

Figure 4:
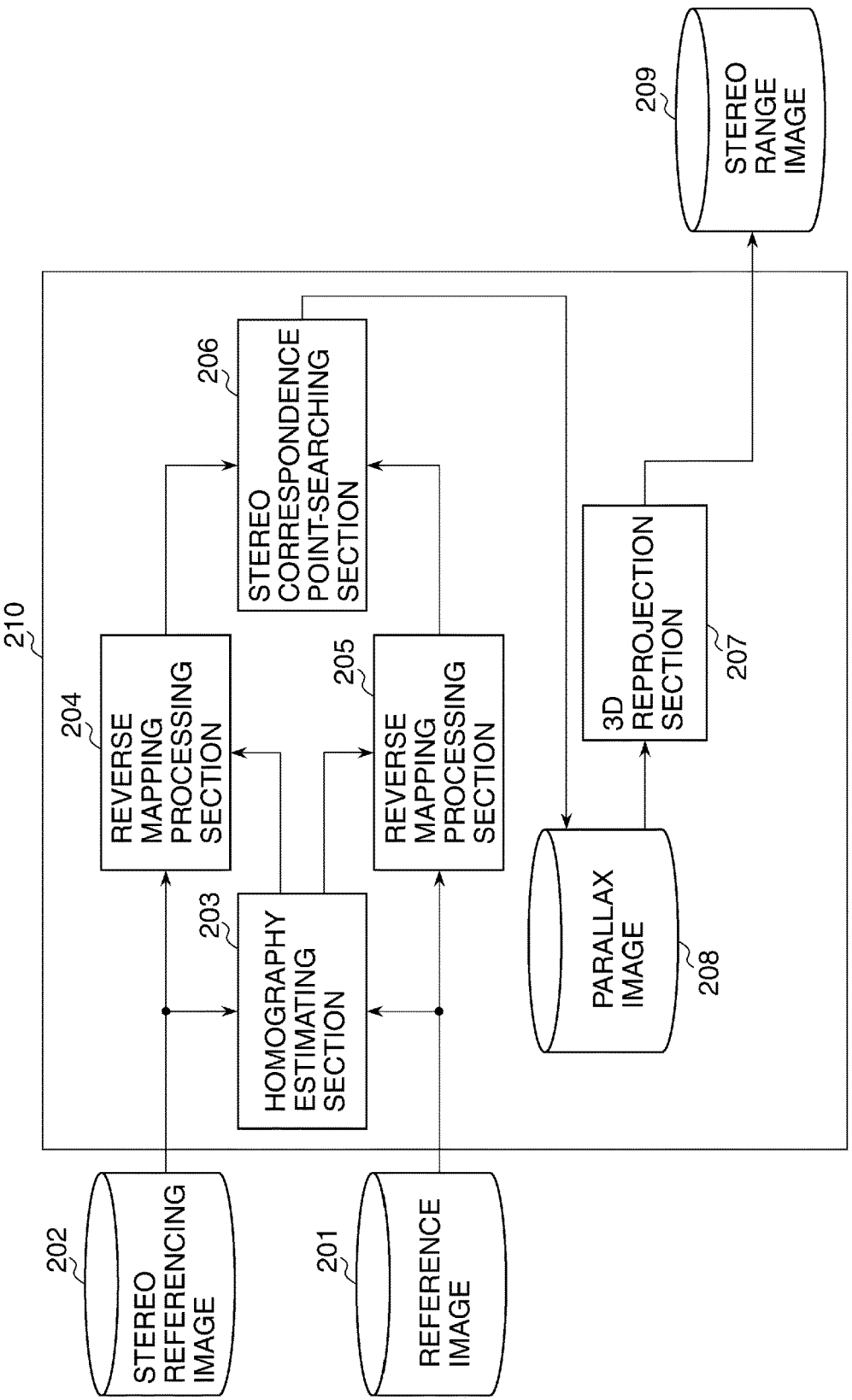
FIG. 4 is a schematic diagram of a stereo range image generation section appearing in FIG. 2.

FIG. 4 is a schematic diagram of the stereo range image generation section 210 appearing in FIG. 2.

Before explaining the stereo range image generation section 210 in FIG. 4, as for generation of a stereo range image, "Learning OpenCV" by Gary Bradski and Adrian Kaehler, Oreilly & Associates Inc. (Oct. 3, 2008) shows that it is possible to generate a stereo range image following steps described hereafter.

First, a distortion caused by the imaging optical system 101 is corrected for two images picked up from right and left different viewpoints. Next, to adjust an angle and a distance of a camera between the right and left different viewpoints, the right and left images are mapped (stereo rectification). Then, parallax images are generated by determining same features through the right and left camera views (stereo correspondence point search). The parallax images are converted to a range image by using geometric position information of the right and left cameras (3D reprojection).

In FIG. 4, the images picked up by the left and right cameras are the reference image 201 and the stereo referencing image 202.

Further, a homography estimating section 203 estimates a homography for stereo rectification. In a homography estimation process executed by the homography estimating section 203, it is necessary to use a coordinate system in which distortion caused by the imaging optical system 101 has been corrected.

A coordinate conversion equation for correction of the distortion is the following equations (5):

$$X_{corrected}=x(1+k_1 r^2+k_2 r^4+k_3 r^6)$$

$$y_{corrected}=y(1+k_1 r^2+k_2 r^4+k_3 r^6) \quad (5)$$

Here, (x, y) represents an original location of a distorted point, and ($X_{corected}$, $y_{corrected}$) represents a new location obtained as a result of the distortion correction. Further, in the above equation (5), r represents a distance of an original location of a distorted point from the center of a lens, and $k_1$, $k_2$, and $k_3$ are distortion correction coefficients determined from a shape of the lens.

Although the distortion correction executed by the homography estimating section 203 is performed only on a radial distortion, this is not limitative, but the distortion correction may be also performed e.g. on a circumferential distortion.

Figure 5:
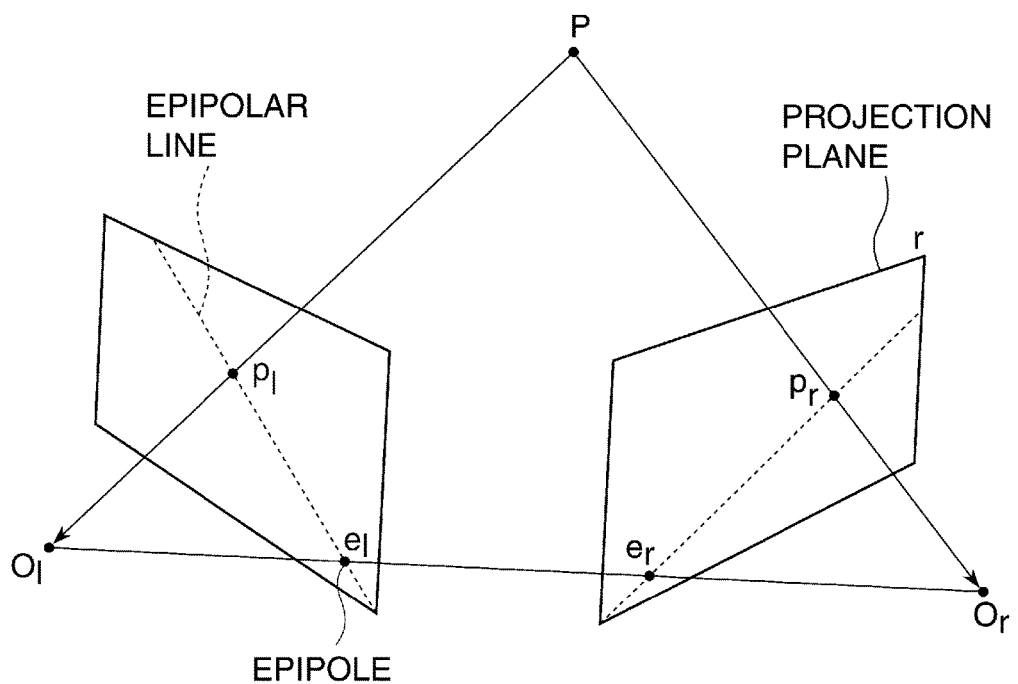
FIG. 5 is a diagram in which an image pickup system formed by right and left viewpoints is represented by a pinhole model.

FIG. 5 is a diagram in which an image pickup system formed by right and left viewpoints is represented by a pinhole model.

In FIG. 5, $O_l$ and $O_r$ indicate respective centers of projection defined by the right and left viewpoints, P indicates a position of an object, $p_l$ and $p_r$ indicate respective imaging positions of the object which is projected on projection planes of the right and left viewpoints, $e_l$ and $e_r$ are respective epipoles in respective projection planes from the right and left viewpoints, and a line extending through $p_l$ and $e_l$ and a line extending through $p_r$ and $e_r$ are respective epipolar lines in views (projection planes) from the right and left viewpoints.

According to the epipolar constraint, when a feature point within one image is given, a point within another image, corresponding to the given feature point, exists on a corresponding epipolar line.

Therefore, the stereo correspondence point search is performed along an epipolar line, and when the epipolar lines are made parallel to each other between the two images and adjusted such that the correspondence points are at the same height, the stereo correspondence point search becomes one-dimensional in a horizontal direction. In this case, the amount of calculation is made much smaller than in the two-dimensional search, and further it is possible to obtain a result having high reliability.

Coordinate conversion in which epipolar lines are made parallel to each other between two images and adjusted such that correspondence points are at the same height is referred to as the stereo rectification. Processing steps of the stereo rectification are executed in the following order:

(1-1) Eight or more feature points, each corresponding between two images, are determined.

(1-2) A base matrix F is determined from the corresponding eight or more feature points.

(1-3) Epipoles $e_l$ and $e_r$ are determined from the base matrix F.

(1-4) A homography $H_r$ for stereo rectification of the right image is estimated from the epipole $e_r$.

(1-5) A homography $H_l$ for stereo rectification of the left image is estimated from the corresponding feature points, the homography $H_r$, and the epipole $e_l$.

In the above processing step (1-1), two-dimensional correspondence point search is performed between the two images by a block matching method to thereby determine necessary correspondence points. Differently from the stereo correspondence point search which searches for correspondence points on a pixel-by-pixel basis, in the case of this two-dimensional correspondence point search, it is only required to search for at least eight corresponding feature points within one image plane, and hence although the search is two-dimensional, it requires a small amount of calculation and has no significant influence on the reliability of the result.

The block matching method employed in the processing step (1-1) is similar to a block matching method employed in the stereo correspondence point search, described hereinafter. However, differently from the block matching method employed in the stereo correspondence point search, which is one for a search in only one-dimensional direction, the block matching method, in which a search range is two-dimensionally expanded, is applied to the processing step (1-1).

In the next processing step (1-2), the base matrix F which is a 3×3 matrix is determined from the eight feature points. As the coordinates of each feature point, the coordinates subjected to the distortion correction in the above equation (5) are used. The following equation (6) is an equation generally referred to as the epipolar equation:

$$(P_r)^T E p_l = 0 \tag{6}$$

wherein E represents a base matrix which is a 3×3 matrix.

Further, it is generally known that by using a camera internal matrix M which is a 3×3 matrix, it is possible to convert three-dimensional physical coordinates p to two-dimensional pixel coordinates q on a projection plane by the following equation (7):

$$q = Mp \tag{7}$$

Further, it is generally known that by using the camera internal matrix M, it is possible to convert the base matrix E into the base matrix F by using the following equation (8):

$$F = (M_r^{-1})^T E M_l^{-1} \tag{8}$$

By using the above equations (6) to (8), it is possible to derive the following equation (9) related to the base matrix F:

$$(q_r)^T F q_l = 0 \tag{9}$$

The base matrix F is a 3×3 matrix, and has a scalar degree of freedom, and hence eight matrix elements out of the nine matrix elements are variables. For this reason, by substituting $q_l$ and $q_r$ of the eight points of the corresponding feature points in the right and left images into the equation (9), simple simultaneous linear equations are obtained, and it is possible to determine the base matrix F by solving the simultaneous linear equations.

As described above, although in the present embodiment, $q_l$ and $q_r$ of the eight feature points, which correspond to each other between the right and left images, are used to determine the base matrix F, this is not limitative, but for example, as disclosed in "Learning OpenCV" by Gary Bradski and Adrian Kaehler, Oreilly & Associates Inc. (Oct. 3, 2008), the base matrix F may be estimated according to a least-square method using eight or more feature points.

In the next processing step (1-3), the epipoles $e_l$ and $e_r$ are calculated from the base matrix F. It is generally known that a relationship between the base matrix F and the epipoles $e_l$ and $e_r$ can be expressed by the following equations (10):

$$F e_l = 0$$

$$(e_r)^T F = 0 \tag{10}$$

and by substituting the obtained base matrix F into the equation (10), it is possible to determine the epipoles $e_l$ and $e_r$.

In the processing step (1-4), the homography $H_r$ is estimated from the epipole $e_r$.

FIGS. 6A to 6D are diagrams useful in explaining a procedure of mapping the homographies $H_l$ and $H_r$.

In FIGS. 6A to 6D, hatched triangles each indicate an image of an object formed on a projection plane of a right image.

Figure 6A:
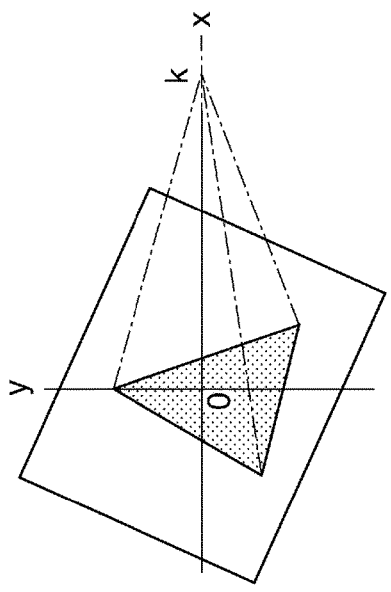
FIGS. 6A to 6D are diagrams useful in explaining a procedure of mapping homographies $H_l$ and $H_r$.

FIG. 6A shows pixel coordinates $(x_e, y_e)$ of the epipole $e_r$. First, a rotation matrix R for mapping the epipole $e_r$ to $(k, 0)$ on an x-axis is determined. That is, this determination is expressed by the following equations (11):

$$\begin{bmatrix} \tilde{x} \\ \tilde{y} \\ 1 \end{bmatrix} = \begin{bmatrix} \cos\theta & \sin\theta & 0 \\ -\sin\theta & \cos\theta & 0 \\ 0 & 0 & 1 \end{bmatrix} \begin{bmatrix} x \\ y \\ 1 \end{bmatrix} = R \begin{bmatrix} x \\ y \\ 1 \end{bmatrix} \quad (11)$$

$$\theta = \tan^{-1}\left(\frac{y_e}{x_e}\right)$$

By applying the equation (11) to the epipole $e_r$, the following equations (12) are obtained:

$$\begin{bmatrix} k \\ 0 \\ 1 \end{bmatrix} = \begin{bmatrix} \cos\theta & \sin\theta & 0 \\ -\sin\theta & \cos\theta & 0 \\ 0 & 0 & 1 \end{bmatrix} \begin{bmatrix} x_e \\ y_e \\ 1 \end{bmatrix} \quad (12)$$

$$\theta = \tan^{-1}\left(\frac{y_e}{x_e}\right)$$

Figure 6B:
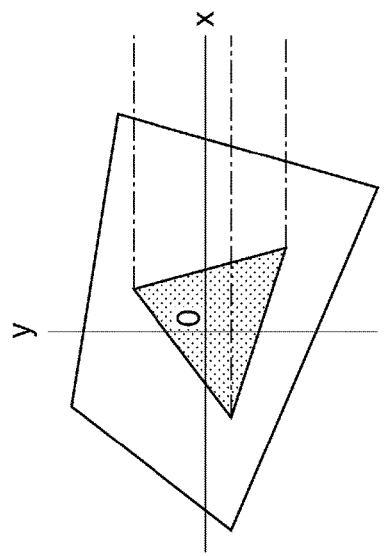

FIG. 6B shows a pixel coordinate system obtained by applying the rotation matrix R to FIG. 6A. Next, a homography G for mapping the epipole (k, 0) mapped on the x-axis to an infinite point (±∞, 0) is determined. That is, the homography G is expressed by the following equation (13):

$$\begin{bmatrix} \hat{x} \\ \hat{y} \\ 1 \end{bmatrix} = \begin{bmatrix} 1 & 0 & 0 \\ 0 & 1 & 0 \\ -1/k & 0 & 1 \end{bmatrix} \begin{bmatrix} \tilde{x} \\ \tilde{y} \\ 1 \end{bmatrix} = G \begin{bmatrix} \tilde{x} \\ \tilde{y} \\ 1 \end{bmatrix} \quad (13)$$

The homography determined as above maps all epipolar lines to straight lines parallel to the x-axis.

Figure 6C:
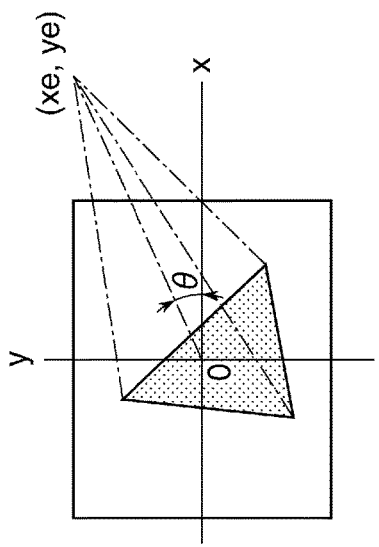

FIG. 6C shows a pixel coordinate system obtained by applying the homography G to FIG. 6B. The epipolar lines shown in FIG. 6C are mapped to straight lines parallel to the x-axis.

From the above-mentioned equations (11) to (13), the homography $H_r$ is expressed by the following equation (14):

$$H_r = GR \quad (14)$$

Figure 6D:
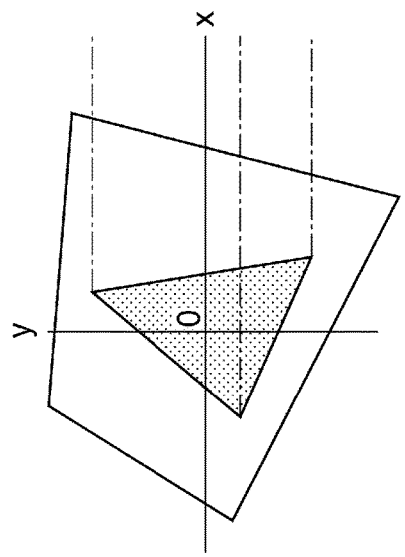

In the processing step (1-5), the homography $H_l$ for stereo-rectifying the left image is estimated from correspondence between the feature points, the homography $H_r$, and the epipole $e_l$. The homography $H_l$ thus estimated maps all epipolar lines of the left image to straight lines parallel to the x-axis, and adjusts the epipolar lines of the right and left images, corresponding to each other, such that they are aligned in height. FIG. 6D shows a diagram in which the epipolar lines of the left image are mapped to the straight lines parallel to the x-axis and each epipolar line is aligned in height to a corresponding one of the right image.

The procedure of mapping all the epipolar lines of the left image to the straight lines parallel to the x-axis can be achieved by the same procedure as in the process step (1-4). Further, matrixes obtained with respect to the left image according to the same procedure are denoted by G' and R'.

Aligning the corresponding epipolar lines of the right and left images in height can be achieved by estimating a homography K which minimizes the total sum of distances between the feature points which exist in the right and left images and correspond to each other. In short, the homography $H_l$ desired to be estimated can be expressed by the following equation (15):

$$H_l = KG'R' \quad (15)$$

Further, to estimate the homography K, the following equation (16) is used:

$$\frac{\partial}{\partial K}\left(\sum_i dd(H_l q_i^l, H_r q_i^r)\right) = 0 \quad (16)$$

Note that dd(Q, R) in the equation (16) represents the sum of squares of distances between two pixel coordinates Q and R. Further, for corresponding pairs of feature points ($q_i^l$, $q_i^r$), it is only required to use those determined by the processing step (1-1).

Referring again to FIG. 4, reverse mapping processing sections 204 and 205 stereo-rectifies the left image (reference image 201) and the right image (stereo referencing image 202) using homography for stereo rectification. A method of reverse mapping for stereo rectification is the same as a method disclosed in "Learning OpenCV" by Gary Bradski and Adrian Kaehler, Oreilly & Associates Inc. (Oct. 3, 2008).

FIGS. 7A to 7D are diagrams useful in explaining a procedure of mapping picked-up images (raw images in FIG. 7A) to stereo-rectified right and left images.

Figure 7A:
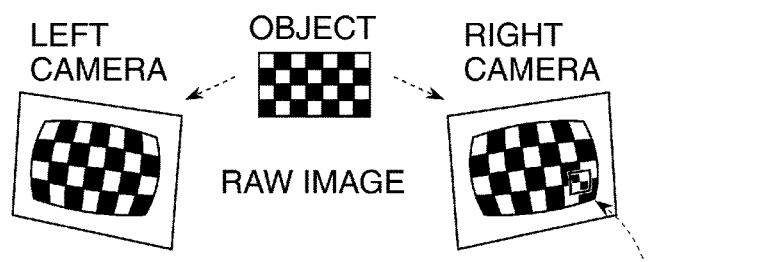
FIGS. 7A to 7D are diagrams useful in explaining a procedure of mapping picked-up images to stereo-rectified right and left images.
Figure 7B:
Figure 7C:
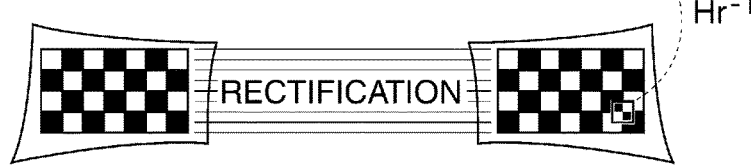

In FIGS. 7A to 7D, reverse mapping processing can be achieved by determining coordinates in distortion-corrected images shown in FIG. 7B with respect to each integer coordinates in a stereo-rectified image shown in FIG. 7C, and referring to decimal coordinates in raw images shown in FIG. 7A using the determined coordinates.

More specifically, pixel interpolation processing is executed within the raw images using the decimal coordinates, and pixel values within the stereo parallelized images shown in FIG. 7C are determined.

Figure 7D:

Note that DIST( ) between FIGS. 7A and 7B indicates inversion of the equation (2) for determining (x, y) from ($x_{corrected}$, $y_{corrected}$) in the equation (5). Further, FIG. 7D shows clipped parallax images.

Referring again to FIG. 4, a stereo correspondence point-searching section 206 generates parallax images 208 from the stereo-rectified left image and right image. A method of the stereo correspondence point search is the same as that disclosed in "Learning OpenCV" by Gary Bradski and Adrian Kaehler, Oreilly & Associates Inc. (Oct. 3, 2008).

FIG. 8 is a diagram useful in explaining the block matching method used in the stereo correspondence point search.

Block matching is performed by sliding a "sum of absolute difference" (SAD) window in a row direction. More specifically, in the block matching, for each feature in the left image, a feature which best matches with the feature is searched from a corresponding row in the right image.

The right and left images are stereo-rectified, and each row forms an epipolar line. A matching point in the right image exists in the same row in the left image, and hence as shown in FIG. 8, the searching direction can be limited e.g. to a row direction from ($x_0$, $y_0$).

With respect to an x-coordinate $x_l$ of one feature point in the left image, a distance [d=($x_l$−$x_r$)] therefrom to an x-coordinate $x_r$ of a correspondence point in the associated right image gives an amount of parallax associated with the x-coordinate $x_l$.

Although FIG. 8 shows a case where the reference image 201 is the left image, when the reference image is the right image, an amount of parallax is calculated with reference to a feature point in the right image. More specifically, with respect to an x-coordinate $x_r$ of one feature point in the right image, a distance [d=(x$_l$−x$_r$)] therefrom to an x-coordinate x$_l$ of a correspondence point in the associated left image gives an amount of parallax associated with the x-coordinate x$_r$.

Referring again to FIG. 4, a 3D reprojection section 207 generates the stereo range image 209 from the parallax images 208.

A 3D reprojection method is the same as that disclosed in "Learning OpenCV" by Gary Bradski and Adrian Kaehler, Oreilly & Associates Inc. (Oct. 3, 2008). It is generally known that a relationship between the distance Z and the parallax amount d is expressed by the following equation (17) based on the triangulation method:

$$Z = \frac{fT}{d} \quad (17)$$

wherein f represents a focal length of the image pickup system, and T represents a distance between the centers of projection which are the viewpoints of the left and right views. The stereo range image 209 generated by the 3D reprojection section 207 using the equation (17) is stored in the memory 106 by the memory controller 105.

Hereafter, the processes executed by the above-described configuration will be described with reference to figures showing flowcharts thereof.

FIG. 9 is a flowchart of a synthesized range image generation process executed by the system controller 107 appearing in FIG. 1.

Figure 10:
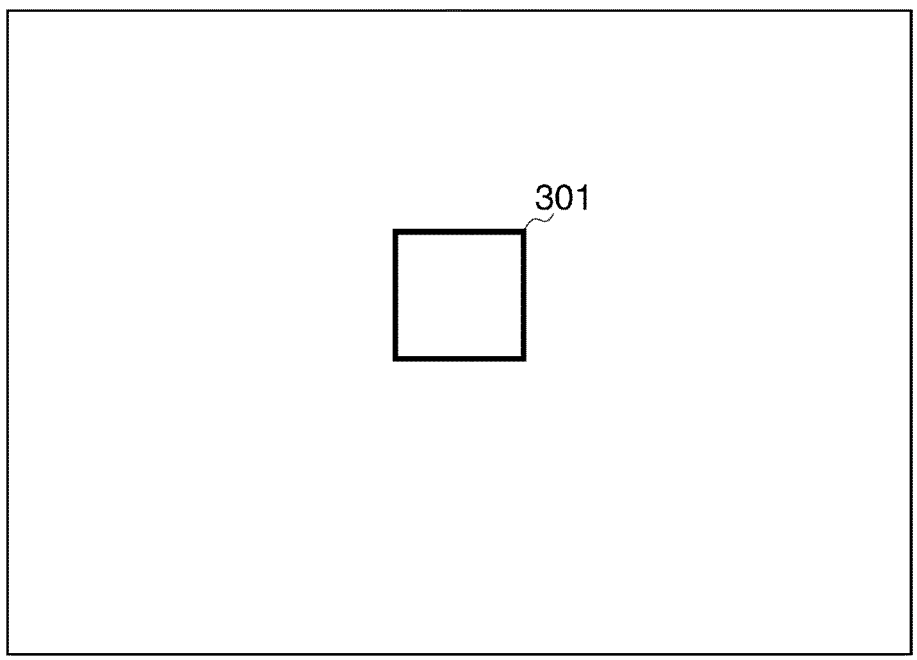
FIG. 10 is a diagram useful in explaining a location of an AF distance measurement frame on an image.

In FIG. 9, first, a stereo referencing image is picked up and updated (step S101). A focal position is adjusted in advance by contrast AF performed by the AF evaluation value acquisition section 108 before the image pickup in the step S101. FIG. 10 is a diagram useful in explaining a location of an AF distance measurement frame on an image, in which the AF distance measurement frame is denoted by reference numeral 301.

The processing in the step S101 is executed until an image pickup instruction is provided by the user operating the operating section 110 (step S102).

When an image pickup instruction is provided by operating the operating section 110 (YES to the step S102), the system controller 107 picks up and updates a reference image (step S103). During the time until the image pickup instruction is provided by the user as mentioned above, the user is moving the position of the image processing apparatus 100 by a framing operation. Then, after the image pickup instruction is provided, the position of the image processing apparatus 100 is finally determined and the reference image is picked up, and hence, parallax dependent on the user's framing operation is generated between the stereo referencing image and the reference image, picked up before and after the image pickup instruction, respectively.

Next, DFD referencing images are picked up by changing the focal position (step S104). Focal positions at which each image pickup operation is performed are set such that they correspond to object distances of 1 m and 20 m, respectively.

Then, a stereo range image is generated from the images having parallax by a stereo range image generation process executed by the stereo range image generation section 210 (step S105). The step S105 corresponds to a function of a first range image generation unit configured to generate a stereo range image from a plurality of images picked up by an image pickup unit and having parallax.

Further, a DFD range image is generated from the images picked up by the image pickup unit and having different degrees of focus at respective corresponding locations within the images, by a DFD range image generation process executed by the DFD range image generation section 224 (step S106). The step S106 corresponds to a function of a second range image generation unit configured to generate a DFD range image from a plurality of images picked up by the image pickup unit and having different degrees of focus at respective corresponding locations within the images.

Then, the generated stereo range image and DFD range image are synthesized by the range image synthesis section 243, whereby a synthesized range image is generated (step S107), followed by terminating the present process. In the processing in the step S107, the synthesized range image is generated by calculating the synthesis coefficient as described above, and hence the step S107 corresponds to functions of a calculation unit and a generation unit.

Figure 11:
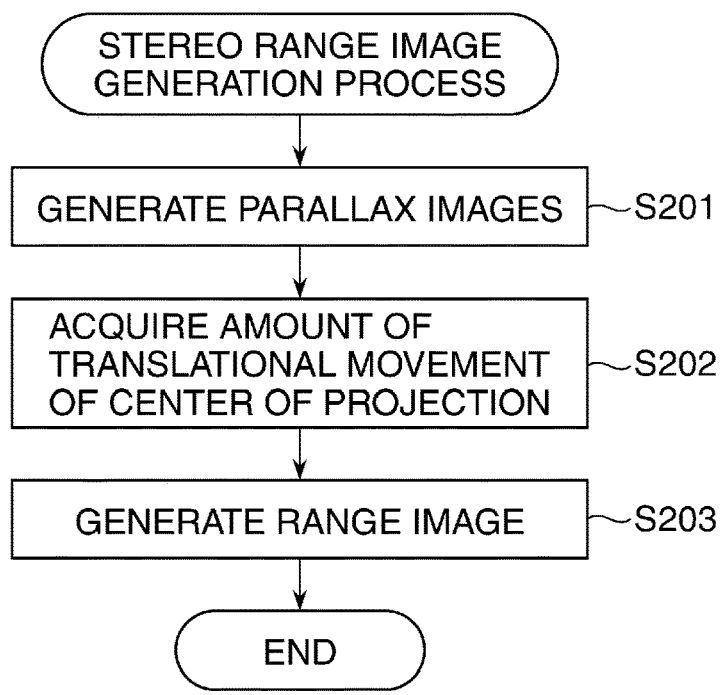
FIG. 11 is a flowchart of a stereo range image generation process executed in a step in FIG. 9.

FIG. 11 is a flowchart of the stereo range image generation process executed in the step S105 in FIG. 9.

In FIG. 11, first, parallax images 208 are generated (step S201). As described hereinabove, the parallax images 208 are generated by processing the right and left images stereo-rectified by the reverse mapping processing sections 204 and 205, using the stereo correspondence point-searching section 206.

Then, an amount of translational movement of the center of projection is acquired from an object distance Z$_0$ of an object which is subjected to auto focus using the AF distance measurement frame 301 and a parallax amount d$_0$ (step S202). The translational movement amount T=(Z$_0$d$_0$/f) is calculated by the above equation (17). Note that the object distance Z$_0$ is calculated in advance by contrast AF performed by the AF evaluation value acquisition section 108 before the image pickup in the step S101. Further, the parallax amount d$_0$ is extracted from the parallax images generated in the step S201.

Then, a range image is generated by applying the equation (17) to each pixel of the parallax images (step S203), followed by terminating the present process.

Figure 12:
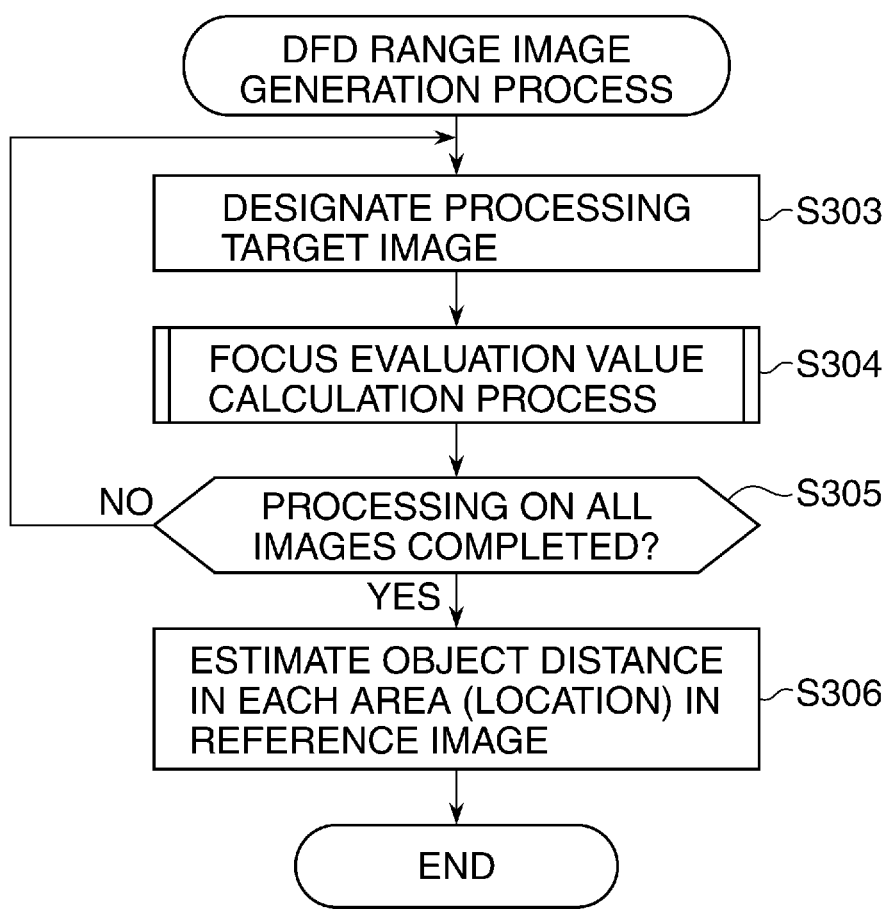
FIG. 12 is a flowchart of a DFD range image generation process executed in a step in FIG. 9.

FIG. 12 is a flowchart of the DFD range image generation process executed in the step S106 in FIG. 9.

In FIG. 12, the DFD range image generation section 224 designates a processing target image for use in processing for determining a focus evaluation value indicative of a degree of focus of the image, from the reference image and the DFD referencing images (step S303). Note that in this step, the DFD range image generation section 224 sequentially designates each of all of the reference image and DFD referencing images as the processing target image, which is an image different in one of the focal position and the aperture value of the imaging optical system 101.

Then, the DFD range image generation section 224 executes a focus evaluation value calculation process to thereby calculate, concerning the processing target image, a focus evaluation value in each area or location within the image (step S304).

Here, the term "each area in the image" refers to each of a plurality of areas (on an X-Y plane) into which a picked up image is two-dimensionally divided. A minimum unit of each area is one pixel. Note that the term "location in the image" refers to an X-Y location of a pixel area (or a single pixel) within the image pickup device, which is included in the image pickup device that has picked up the processing target image. An area or location where a focus evaluation value is calculated is common to all processing target images. In the following description, an area or location is simply expressed as an area.

Further, in the step S304, the DFD range image generation section 224 generates a focus evaluation value map indicative of a correspondence relationship between each area or location in the processing target image and a focus evaluation value. Note that as the degree of focus of an image is higher, the focus evaluation value of each area or location indicates a higher value.

Next, the DFD range image generation section 224 determines whether or not the focus evaluation value calculation process on all processing target images has been completed (step S305).

If it is determined in the step S305 that the focus evaluation value calculation process on all processing target images has not been completed (NO to the step S305), the process returns to the step S303.

On the other hand, if it is determined in the step S305 that the focus evaluation value calculation process on all processing target images has been completed (YES to the step S305), the following processing is executed:

The DFD range image generation section 224 uses a first focus evaluation value map associated with the reference image, a second focus evaluation value map associated with the DFD referencing image, and focal position information obtained when the respective images have been picked up. By using these, the DFD range image generation section 224 estimates an object distance associated with each area in the reference image (step S306), followed by terminating the present process.

More specifically, the DFD range image generation section 224 determines a difference in focus evaluation value of each corresponding image area between the first focus evaluation value map and the second focus evaluation value map to thereby calculate an amount of change in focus evaluation value of each area. Note that when a plurality of DFD referencing images exist, the DFD range image generation section 224 calculates an amount of change in focus evaluation value between each DFD referencing image and the reference image.

Now, a case is considered in which an object of interest in one area is in focus in the reference image and is out of focus in the DFD referencing image. In this case, the focus evaluation value of the area corresponding to the object of interest indicates a high value in the first focus evaluation value map, but the focus evaluation value of the area corresponding to the object of interest indicates a much lower value in the second focus evaluation value map than the value in the first focus evaluation value map.

Therefore, in this case, the amount of change in focus evaluation value of the area corresponding to the object of interest indicates a large value.

On the other hand, in a case where the object of interest is out of focus in both of the reference image and the DFD referencing image, the focus evaluation value of the area corresponding to the object of interest is small in both of the first focus evaluation value map and the second focus evaluation value map.

Therefore, in this case, the amount of change in focus evaluation value of the area corresponding to the object of interest indicates a relatively small value.

As a consequence, an area where the focus evaluation value in the reference image is high and the focus evaluation value is largely reduced in the DFD referencing image can be estimated as an area which is shifted from an in-focus state to an out-of-focus state due to movement of the focal position.

On the other hand, an area where the focus evaluation value in the reference image is low and the focus evaluation value is increased in the DFD referencing image can be estimated as an area which enters an in-focus state at the focal position of the DFD referencing image.

At this time, by referring to a direction and an amount of the movement of the focal position between the reference image and the DFD referencing image, it is possible to determine whether the area where the object of interest exists is in front-focus or rear-focus with reference to the focal position of the reference image. Further, the DFD range image generation section 224 can determine how far the area is distant from a focal plane of the reference image.

Similarly, an area where the focus evaluation value in the reference image is low and the amount of change in focus evaluation value between the reference value and the DFD reference value is also small can be estimated as an area where both of the focal position in the reference image and the focal position in the DFD referencing image are far from the focal plane.

Further, an area where the focus evaluation value in the reference image is high and the amount of change in focus evaluation value between the reference value and the DFD reference value is small can be estimated as an area which is in focus at both of the focal position in the reference image and the focal position in the DFD referencing image.

In the above-described step S306, the DFD range image generation section 224 generates, based on the above estimation results, information of the object distance associated with each area within the reference image.

For example, the DFD range image generation section 224 may express each object distance by a relative distance from an object which is in focus at the focal position of the reference image or a degree of focus, based on a level of the focus evaluation value and the amount of change.

Alternatively, the DFD range image generation section 224 may identify a focal position which provides an in-focus state (in-focus lens position), at each location in the image, and may express the object distance directly by the value of the object distance associated with this focal position (in-focus lens position).

Figure 13:
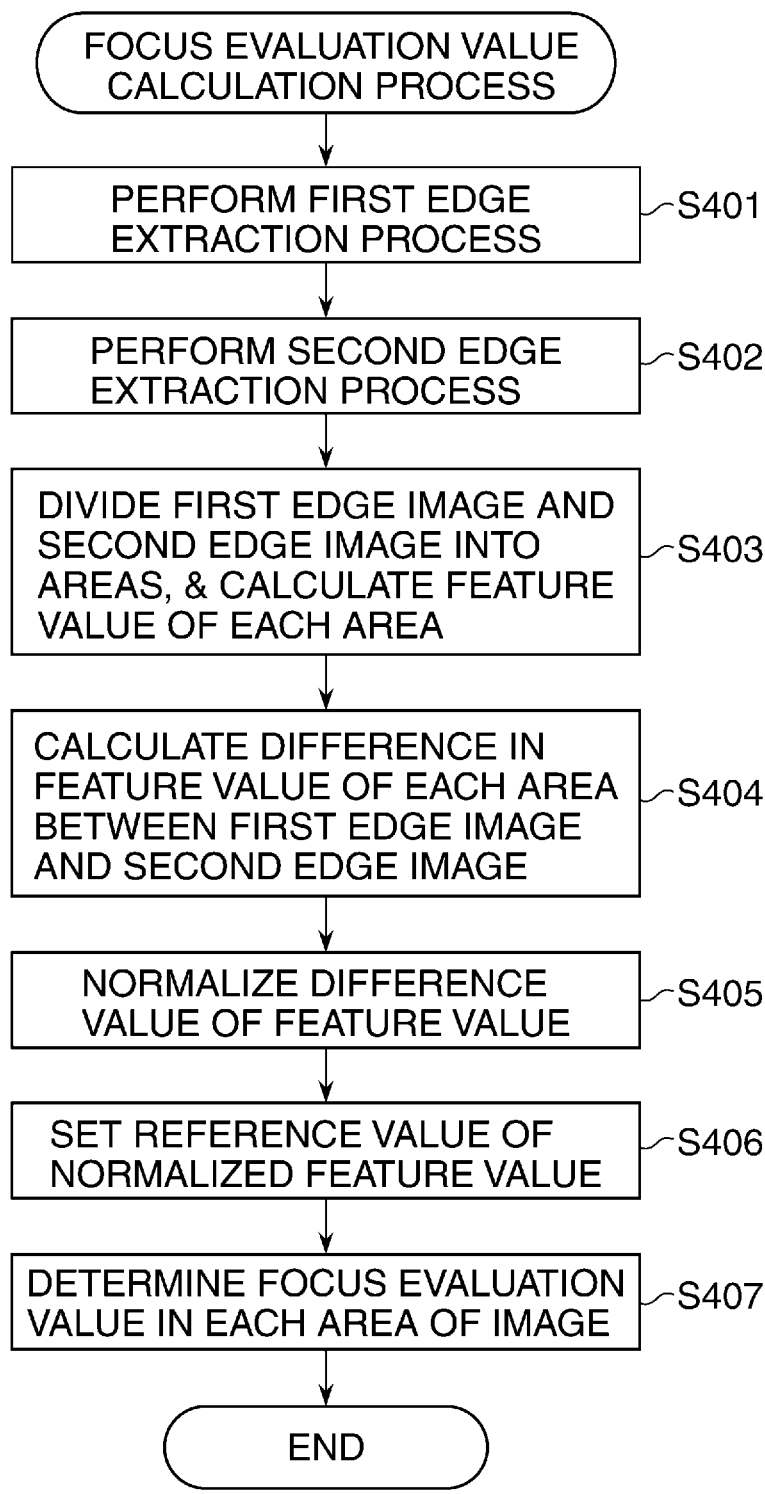
FIG. 13 is a flowchart of a focus evaluation value calculation process executed in a step in FIG. 12.

FIG. 13 is a flowchart of the focus evaluation value calculation process executed in the step S304 in FIG. 12.

In FIG. 13, the DFD range image generation section 224 performs a pair of edge extraction processes which are different in frequency characteristics on a processing target image, and calculates a focus evaluation value using a difference between a pair of edge amounts calculated by these edge extraction processes.

First, the DFD range image generation section 224 performs a first edge extraction process on the processing target image, and generates a first edge image indicative of a correspondence relationship between the sharpness of each extracted edge component and the location of the same in the image (step S401).

Next, the DFD range image generation section 224 performs a second edge extraction process on the processing target image such that edge components extracted thereby includes frequency components on a lower side than those extracted in the step S401. Then, the DFD range image generation section 224 generates a second edge image indicative of a correspondence relationship between the sharpness of each extracted edge component and the location of the same on the image (step S402).

Then, the DFD range image generation section 224 divides each of the first edge image and the second edge image into areas each having a size of e.g. approximately 20 pixels×20 pixels, and calculates a feature value on an area basis (step S403).

Then, the DFD range image generation section 224 calculates a difference in feature value between each corresponding pair of areas of the first edge image and the second edge image (step S404) to thereby determine an amount of change between the first and second edge images on a corresponding area basis.

The DFD range image generation section 224 normalizes a value of the difference in feature value of each area, calculated in the step S404, using the edge amount determined from the first edge image or the second edge image (step S405).

The DFD range image generation section 224 calculates an average value of all normalized feature values calculated in the step S405, and sets the average value as a reference value of the normalized feature value (step S406). However, if the reference value has already been determined using another input image, the DFD range image generation section 224 may set the already determined value as the reference value.

The DFD range image generation section 224 compares the normalized feature value of each area (step S405) and the reference value of the normalized feature value (step S406) to thereby determine the focus evaluation value of each area (step S407), followed by terminating the present process.

The above-described steps will be described in further detail with reference to FIG. 14.

Figure 14:
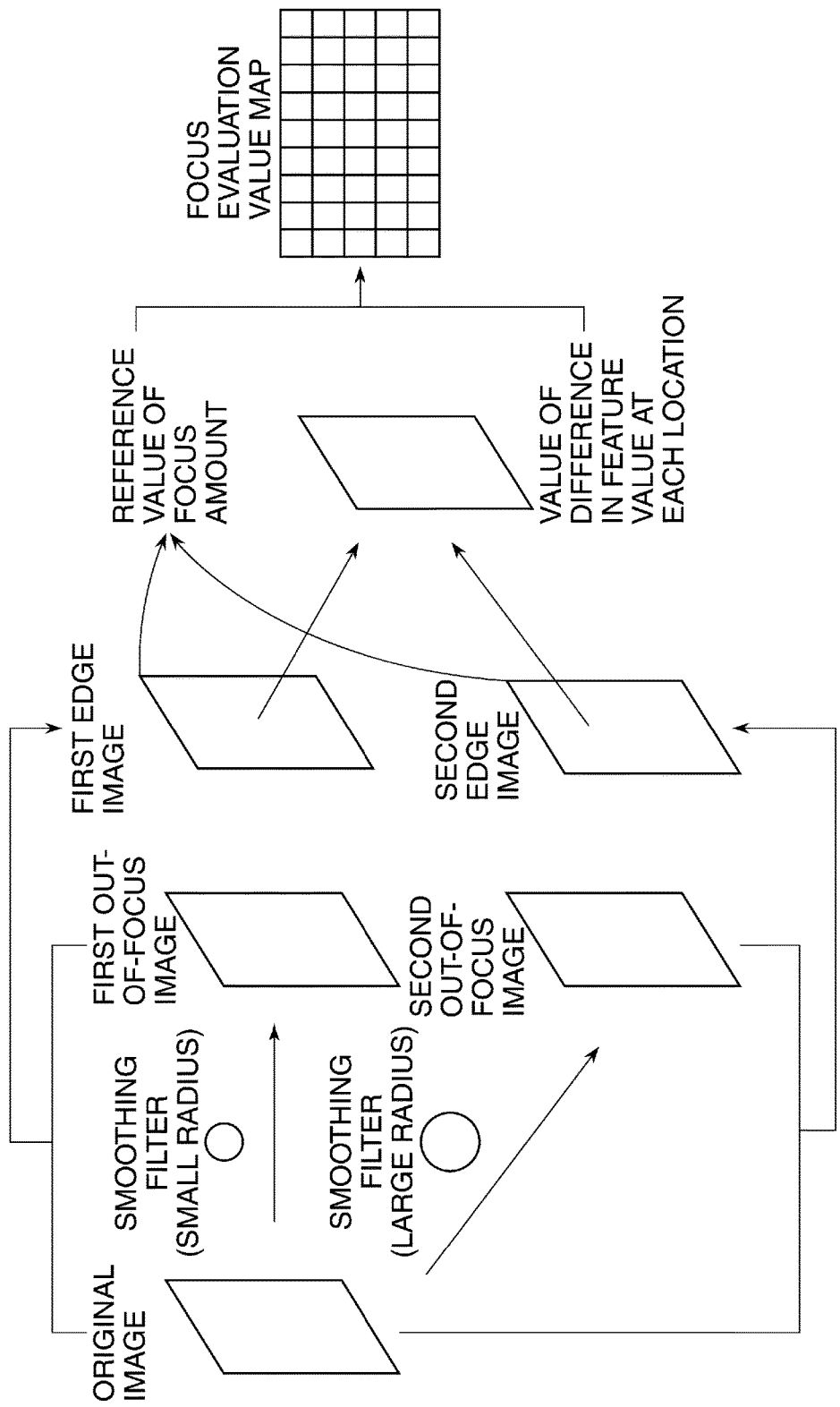
FIG. 14 is a diagram useful in explaining processing executed in the focus evaluation value calculation process in FIG. 13.

FIG. 14 is a diagram useful in explaining processing executed in the focus evaluation value calculation process in FIG. 13.

First, in the step S401, the DFD range image generation section 224 executes the following processing (A1) and (A2):

(A1) The DFD range image generation section 224 performs filter calculation on a processing target image using a Gaussian smoothing filter. It is assumed, by way of example, that the DFD range image generation section 224 in the step S401 uses a smoothing filter of $P(r) \propto \exp(-r^2/2\sigma^2)$.

Note that a value of a parameter σ associated with the strength and radius of the smoothing filter used in the step S401 can be set as desired. By execution of this processing, as shown in FIG. 14, a first out-of-focus image which has been smoothed from an original image is generated. The parameter σ is hereinafter referred to as the "filter radius".

(A2) The DFD range image generation section 224 subtracts each pixel value of the first out-of-focus image from an associated pixel value at a corresponding location in the original image, and determines the absolute value of each pixel value after subtraction. The DFD range image generation section 224 thus extracts edge components which are lost when the original image is smoothed to thereby generate the first edge image as shown in FIG. 14.

The second edge image generated in the step S402 is generated in a similar manner. However, compared with the processing (A1) executed in the step S401, in smoothing performed in the processing (A2) executed in the step S402, the filter radius 6 of the smoothing filter is larger.

Therefore, in the step S402, a degree of smoothing becomes higher than that in the processing (A1). That is, a second out-of-focus image includes less frequency components on a higher frequency region, and more frequency components on a lower frequency region, compared with the first out-of-focus image, and hence the second out-of-focus image has edges which are lower in sharpness than those of the first out-of-focus image.

Note that in an area in which an image is out of focus, a slight change in the value of the filter radius σ hardly changes the edge amount.

On the other hand, in an area in which an image is in focus, even a slight change in the value of the filter radius σ largely changes the edge amount.

Then, in the steps S401 and 402, by setting values of the filter radius σ to values close to each other, the behavior of the change in the edge amount is largely different between the in-focus area and the out-of-focus area when a difference in feature value, referred to hereinafter, is calculated, which makes it relatively easy to measure a degree of focus.

The value of the filter radius σ may be set to 0.5 in the step S401 and to 0.6 in the step S402, by way of example.

Next, the processing in the step S403 will be described. In the step S403, the DFD range image generation section 224 integrates, for each area of each edge image, edge amounts of all pixels included in the area, and divides a value thus integrated by the number of pixels in each area to calculate a quotient as a feature value. That is, the feature value is an average value of the edge amounts within one area. This makes it possible to express the feature of each area by one value.

Next, the processing in the step S404 will be described. As described hereinabove, in an out-of-focus area, a slight change in the value of the filter radius σ hardly changes the edge amount, but in an in-focus area, even a slight change in the value of the filter radius σ largely changes the edge amount.

For this reason, it is understood that by checking the amount of change in the edge amount in each area when the filter radius of the smoothing filter is changed within a small range, it is possible to determine whether the degree of focus in each area is strong or weak.

Next, the processing in the step S405 will be described. For example, the DFD range image generation section 224 may normalize the difference value in each area by dividing the difference value by the feature value of a corresponding area in the first edge image.

As the feature value used in this step, a feature value in the corresponding area in the second edge image, or an average value of the feature values in the respective corresponding areas in the first edge image and the second edge image may be used.

Then, the DFD range image generation section 224 sets the value which has been normalized in the step S405 as a focus amount in each area.

At the time of execution of the above-described step S404, when a comparison is made directly between a change in the edge at a location where the value of the edge amount included in the image is originally large and a change in the edge at a location where the value of the edge amount included in the image is small, there is a high possibility that the former is larger. Note that the location where the value of the edge amount is large is a location where the pixel value is large due to high brightness, and the location where the value of the edge amount is small is a location where the pixel value is small due to low brightness.

That is, there is a possibility that the degree of focus is evaluated to be high at a location where an image is out of focus but the difference in brightness is large. To overcome this inconvenience, in the step S405, the DFD range image generation section 224 suppresses the difference in brightness from affecting the degree of focus, by normalizing the difference value by the edge amount of the edge image.

Next, the processing in the step S407 will be described. In the step S407, a normalized feature value in each area and a reference value of the normalized feature value are compared. For this comparison, a value obtained by subtracting the reference value from a focus amount or a value obtained by dividing a focus amount by the reference value may be used.

By determining the focus evaluation value as described above, the DFD range image generation section 224 can acquire a focus evaluation value map. Note that when comparing the focus evaluation value maps obtained from different images, the DFD range image generation section 224 normalizes the focus evaluation value maps on an as-needed basis, by taking into consideration a difference in brightness between the images.

According to the above-described first embodiment, it is possible to prevent the number of focal positions for image pickup from being increased and the distance accuracy from being reduced due to the influence of an aperture value of the imaging optical system or a distance measurement range.

Next, a description will be given of a second embodiment of the present invention. The second embodiment is distinguished from the first embodiment in a method of determining the synthesis coefficient K. The image processing apparatus 100 according to the second embodiment has the same hardware configuration and software configuration as the image processing apparatus 100 according to the first embodiment, and hence the same component elements are denoted by the same reference numerals, and description thereof is omitted.

The range image synthesis section 243 in the second embodiment is the same as that in the first embodiment in synthesizing range images using the equation (4), and the synthesis coefficient K is determined by the following equation (18):

$$K = K1 \cdot K2 \quad (18)$$

The range image synthesis section 243 selects an object brought into focus by contrast AF, as a main object, and determines the synthesis coefficient K1 according to the depth of field of the main object.

For example, assuming that the diameter of the permissible circle of confusion is 0.03328 mm, the aperture value is set to 2.8, the focal length is set to 50 mm, and the object distance to the main object is 9 m, the depth of field is determined to be 6.80 m from the equations (1) to (3).

Figure 15:
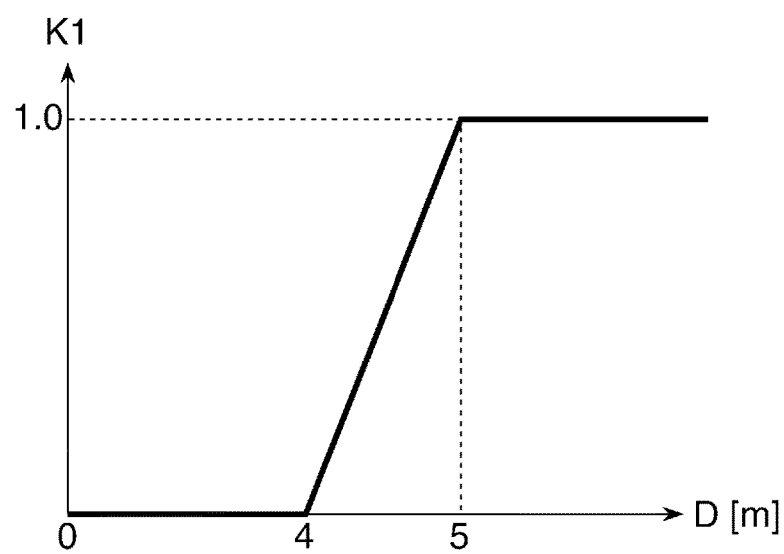
FIG. 15 is a graph useful in explaining how a synthesis coefficient is determined according to the depth of field.

FIG. 15 is a graph useful in explaining how the synthesis coefficient K1 is determined according to the depth of field D.

In FIG. 15, for example, when the depth of field of the main object is 6.80 m, the synthesis coefficient K1 becomes 1.0. Further, when the depth of field of the main object is within a range of 4.0 m to 5.0, the value of the synthesis coefficient K1 monotonically increases from 0 to 1.

Further, the range image synthesis section 243 selects an object brought into focus by contrast AF, as a main object, and determines the synthesis coefficient K2 according to a range of the depth of field of the main object.

Figure 16:
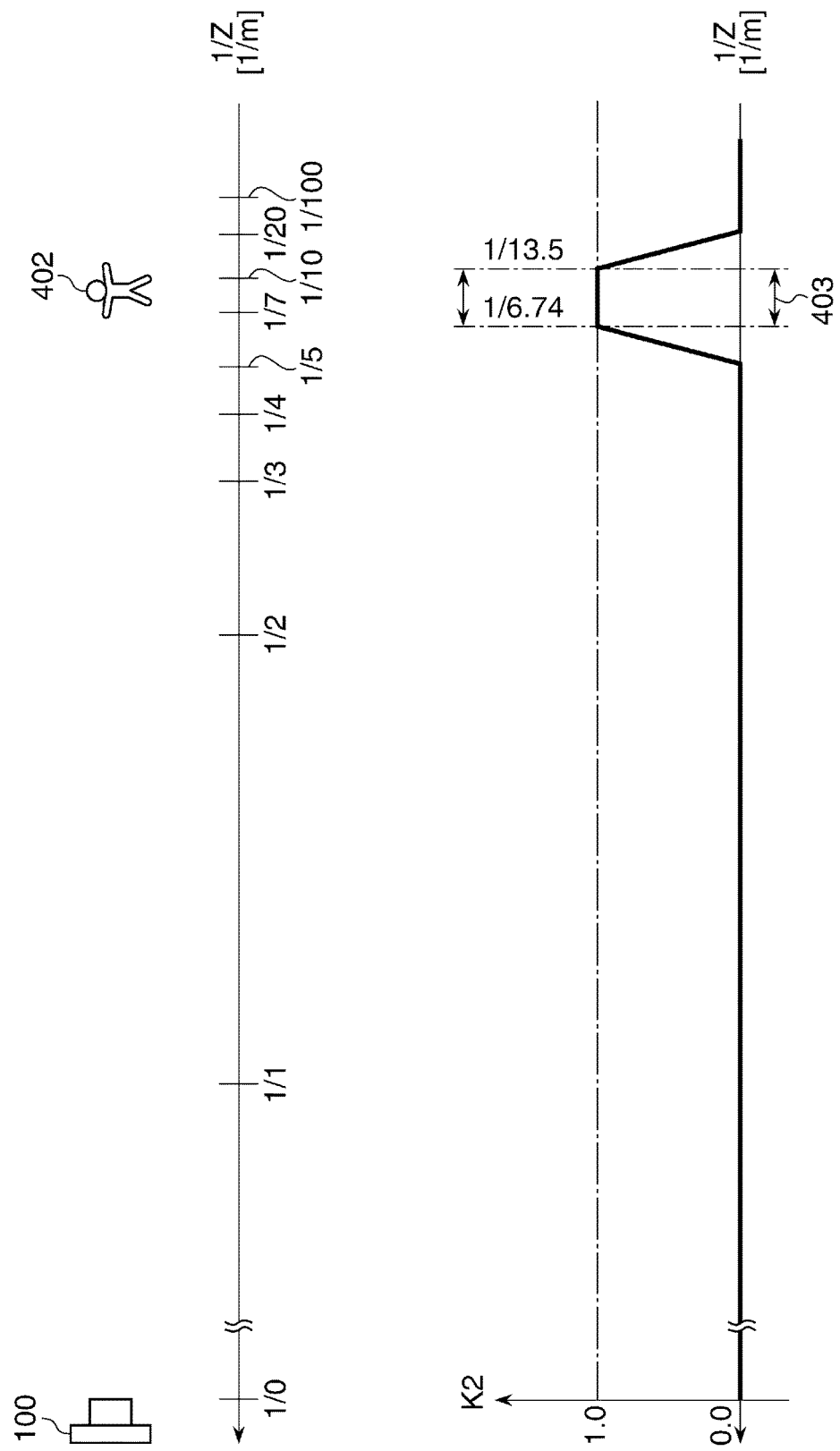
FIG. 16 is a graph useful in explaining how another synthesis coefficient is determined.

FIG. 16 is a graph useful in explaining how the synthesis coefficient K2 is determined.

In FIG. 16, a main object 402 is an object which is brought into focus by contrast AF.

For example, assuming that the diameter of the permissible circle of confusion is 0.03328 mm, the aperture value is set to 2.8, the focal length is set to 50 mm, and the object distance to the main object 402 is 9 m, the range of the depth of field of the main object 402 is indicted by a range 403 from the equations (1) to (3).

As for the distance Z which is required to determine the synthesis coefficient K2, the stereo range image 209 is referred to. As described above, the synthesis coefficient K is calculated such that values taken within the range of depth of field are larger than values taken outside the range of the depth of field.

According to the above-described second embodiment, it is possible to prevent the number of focal positions for image pickup from being increased and the distance accuracy from being reduced due to the influence of an aperture value of the imaging optical system or a distance measurement range. Further, in a distance range outside the depth of field of the main object, the stereo range image is switched to the DFD range image, and hence it is possible to improve the distance accuracy of the distance range outside the depth of field of the main object.

Next, a description will be given of a third embodiment of the present invention. The image processing apparatus 100 according to the third embodiment is distinguished from that according to the first embodiment in the number and locations of the AF distance measurement frame, the synthesized range image generation process executed by the system controller 107, and the range image synthesis section 243. The image processing apparatus 100 according to the third embodiment has the same hardware configuration and software configuration as those in the first embodiment except the points mentioned above, and hence the same component elements are denoted by the same reference numerals, and description thereof is omitted.

Figure 17:
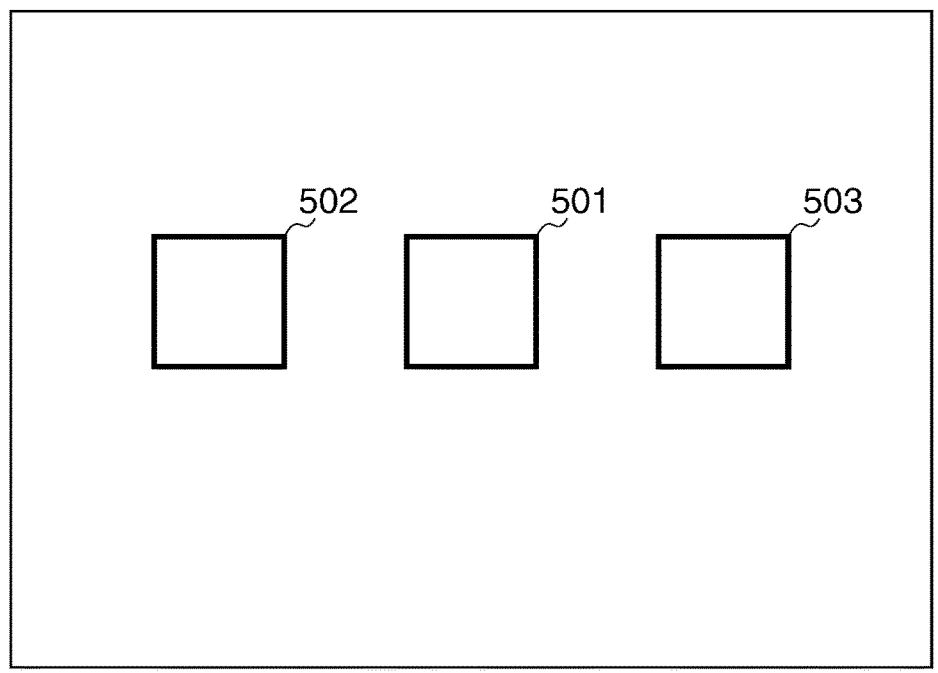
FIG. 17 is a diagram useful in explaining locations of AF distance measurement frames on a screen.

FIG. 17 is a diagram useful in explaining locations of the AF distance measurement frames on a screen.

FIG. 17 shows a center frame 501 for a main object, a left frame 502 for a non-main object, and a right frame 503 for a non-main object, as the AF distance measurement frames. In the third embodiment, these AF distance measurement frames are used.

Figure 18:
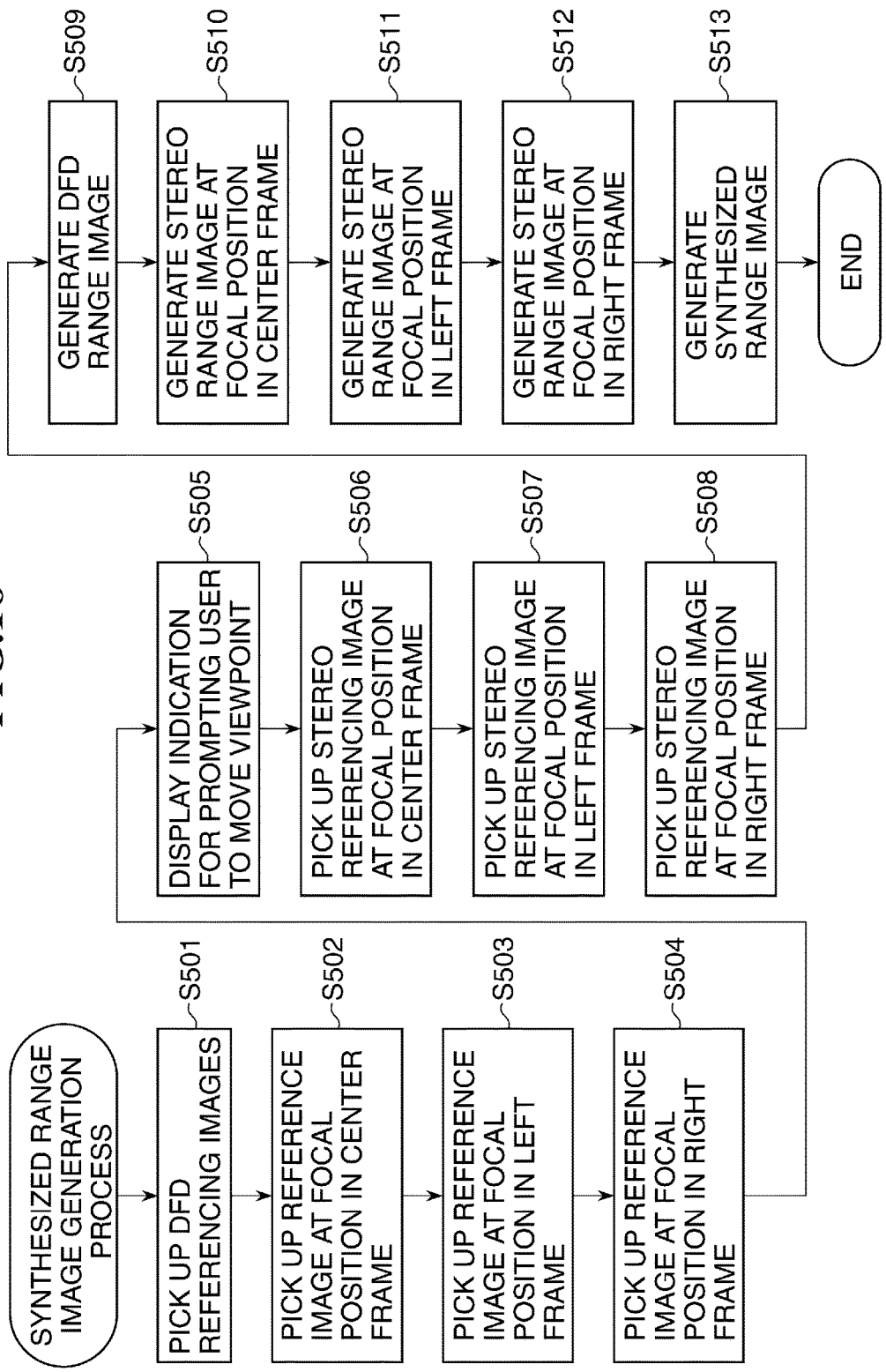
FIG. 18 is a flowchart of a synthesized range image generation process executed by the system controller appearing in FIG. 1.

FIG. 18 is a flowchart of a synthesized range image generation process executed by the system controller 107 appearing in FIG. 1.

In FIG. 18, first, DFD referencing images are picked up (step S501). The focal positions for image pickup in this step correspond to object distances of 1 m and 20 m.

Next, a reference image is picked up at a focal position determined by contrast AF within the center frame 501 for the main object (step S502).

Subsequently, a reference image is picked up at a focal position determined by contrast AF within the left frame 502 for the non-main object (step S503). Further, a reference image is picked up at a focal position determined by contrast AF within the right frame 503 for the non-main object (step S504).

Then, an indication for prompting a user to move the viewpoint is displayed on the display section 109 (step S505). Then, a stereo referencing image is picked up at a focal position determined by contrast AF within the center frame 501 for the main object (step S506).

Subsequently, a stereo referencing image is picked up at a focal position determined by contrast AF within the left frame 502 for the non-main object (step S507). Further, a stereo system reference image is picked up at a focal position determined by contrast AF within the right frame 503 for the non-main object (step S508).

Then, a DFD range image is generated using the reference image picked up at the focal position within the center frame 501 and the DFD referencing images (step S509).

Further, a stereo range image within the center frame 501 for the main object is generated (step S510).

Subsequently, a stereo range image for the non-main object in the left frame 502 is generated (step S511). Further, a stereo range image for the non-main object in the right frame 503 is generated (step S512).

The stereo range images generated at the respective focal positions in the three frames and the DFD range image are synthesized by the range image synthesis section 243 to thereby generate a synthesized range image (step S513), followed by terminating the present process.

The range images are synthesized by the following equations (19) to (24):

$$Z_{MIX\_R}(x,y)=K\_R \cdot Z_{STR\_R}(x,y)+(1-K\_R) \cdot Z_{DFD}(x,y) \quad (19)$$

$$Z_{MIX\_L}(x,y)=K\_L \cdot Z_{STR\_L}(x,y)+(1-K\_L) \cdot Z_{MIX\_R}(x,y) \quad (20)$$

$$Z_{MIX}(x,y)=K\_C \cdot Z_{STR\_C}(x,y)+(1-K\_C) \cdot Z_{MIX\_L}(x,y) \quad (21)$$

$$K\_R=K1\_LR \cdot K2\_R \quad (22)$$

$$K\_L=K1\_LR \cdot K2\_L \quad (23)$$

$$K\_C=K1\_C \cdot K2\_C \quad (24)$$

Symbols used in the equations (19) to (24) represent as follows:

(x,y): location of each pixel
$Z_{MIX}(x,y)$: synthesized range image
$Z_{MIX\_L}(x,y)$, $Z_{MIX\_R}(x,y)$: right and left intermediate synthesized range images
$Z_{STR\_C}(x,y)$: stereo range image in the center frame 501
$Z_{STR\_L}(x,y)$ stereo range image in the left frame 502
$Z_{STR\_R}(x,y)$ stereo range image in the right frame 503
$Z_{DFD}(x,y)$: DFD range image
K_C: synthesis coefficient for the center frame 501
K_L: synthesis coefficient for the left frame 502
K_R: synthesis coefficient for the right frame 503

Figure 19:
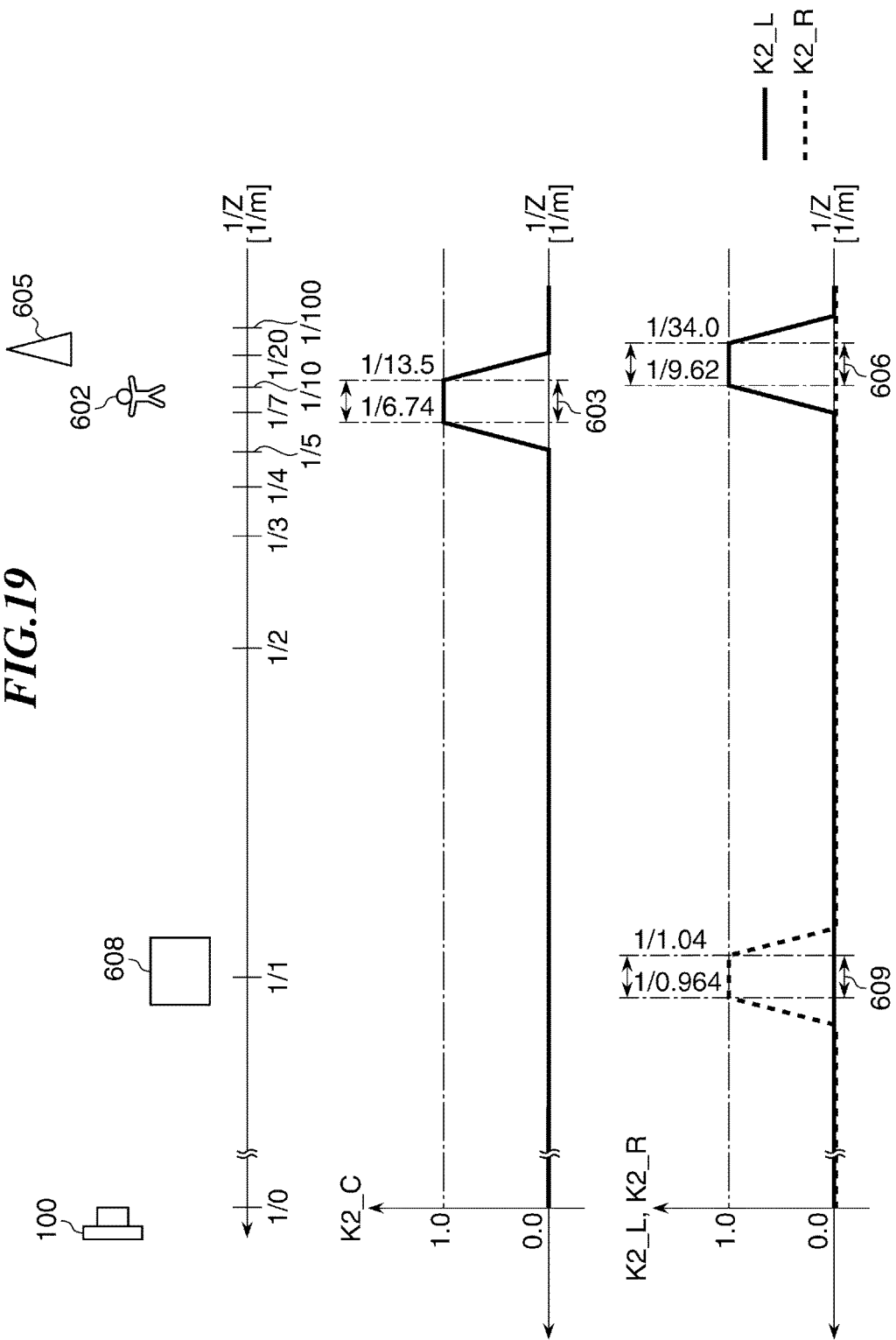
FIG. 19 is a graph useful in explaining how synthesis coefficients are determined.

FIG. 19 is a graph useful in explaining how the synthesis coefficients K2_C, K2_L, and K2_R are determined.

In FIG. 19, a main object 602 is an object brought into focus by contrast AF within the center frame 501. A non-main object 605 and a non-main object 608 are objects which are brought into focus by contrast AF in the left frame 502 and the right frame 503, respectively.

For example, let it be assumed that the diameter of the permissible circle of confusion is 0.03328 mm, the aperture value is set to 2.8, the focal length is set to 50 mm, the object distance to the main object 602 is 9 m, the object distance to the non-main object 605 is 15 m, and the object distance to the non-main object 608 is 1 m. At this time, the ranges of the depth of field of the respective objects are determined as ranges 603, 606, and 609 from the equations (1) to (3).

Figure 20:
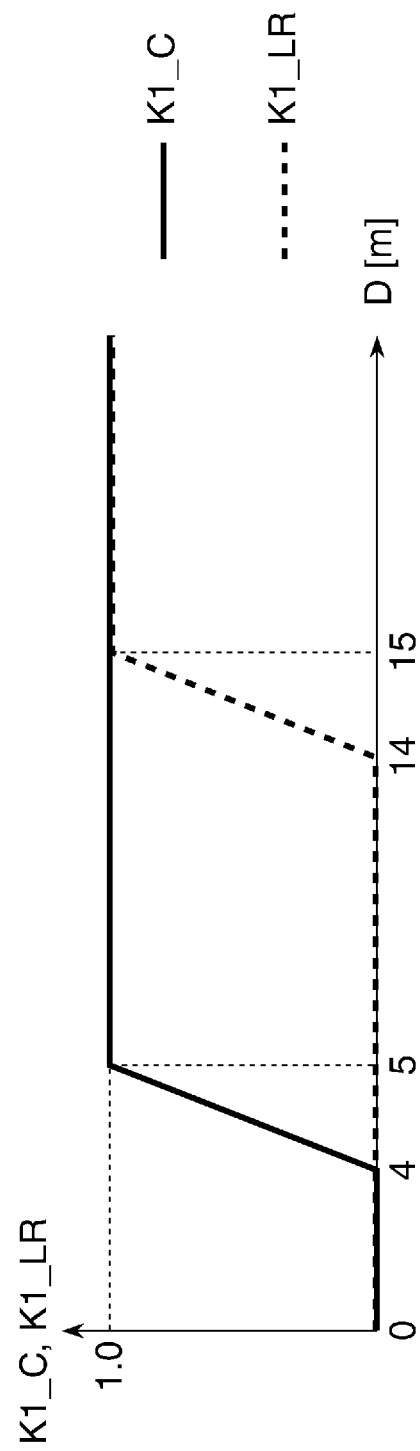
FIG. 20 is a diagram showing a graph used for determining other synthesis coefficients.
Figure 21:
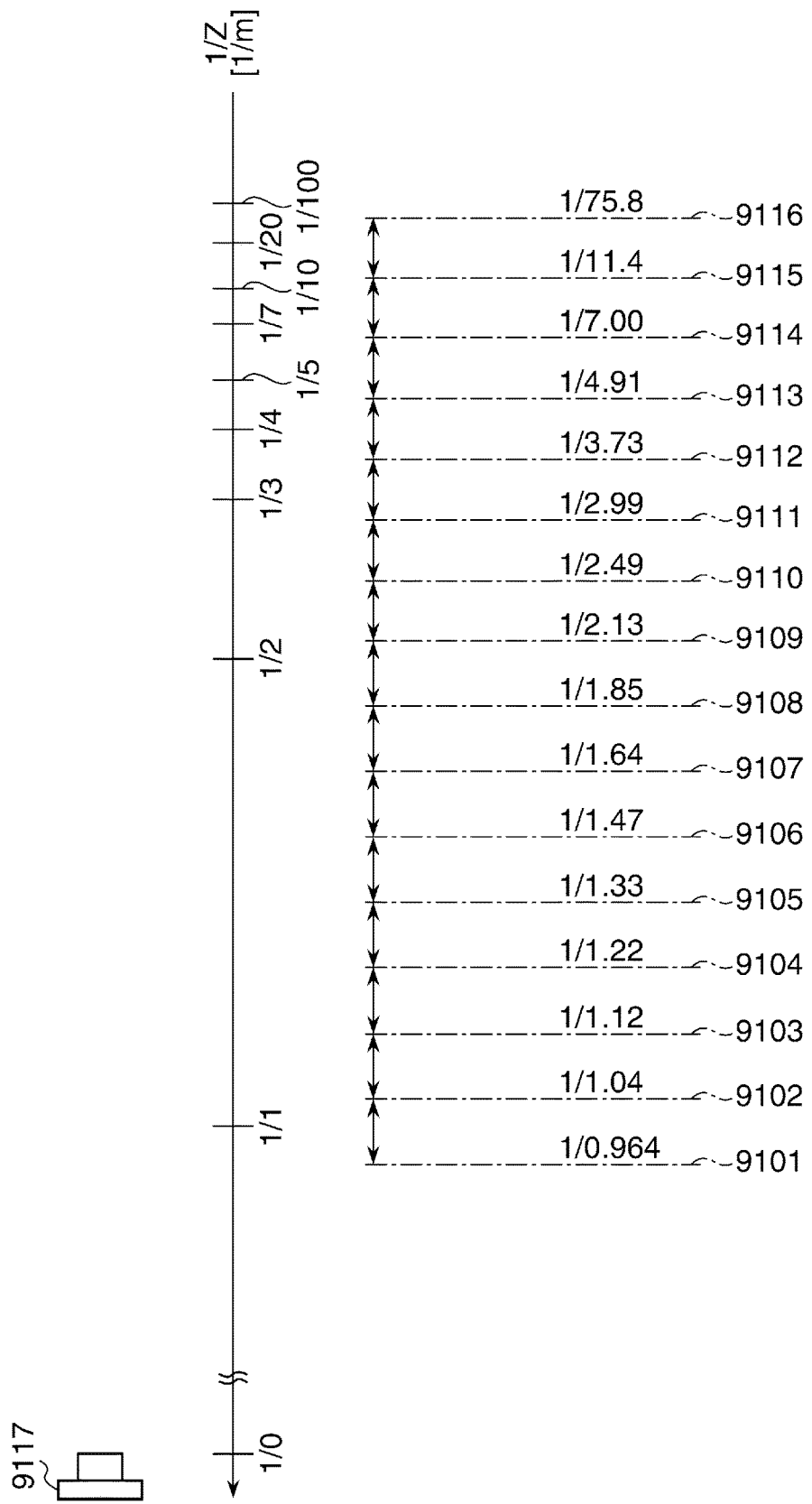
FIG. 21 is a diagram useful in explaining a plurality of focal positions.

FIG. 20 is a graph useful in explaining how the synthesis coefficients K1_C and K1_LR are determined.

In the case of the non-main object, the depth of field in which the synthesized range image is formed preferentially by the stereo range image is deeper than in the case of the main object.

For example, assuming that the diameter of the permissible circle of confusion is 0.03328 mm, the aperture value is set to 2.8, the focal length is set to 50 mm, and the object distance to the main object 602 is 9 m, the depth of field of the main object 602 is determined to be 6.80 m from the equations (1) to (3). In this case, the associated synthesis coefficient K1_C is equal to 1.0 as shown in FIG. 20.

Further, assuming that the object distance to the non-main object 605 is 15 m, and the object distance to the non-main object 608 is 1 m, values of depth of field of the non-main objects 605 and 608 are determined to be 24.4 m and 0.75 m, respectively, from the equations (1) to (3). In this case, the synthesis coefficient K1_LR associated with the non-main object 605 is equal to 1.0, and the synthesis coefficient K1_LR associated with the non-main object 608 is equal to 0.0. As described above, the synthesis coefficients are calculated further using values of depth of field of the non-main objects which are different from the main object.

Further, in the third embodiment, as the other first range images associated with the non-main objects, the stereo range image in the left frame 502 and the stereo range image in the right frame 503 are further generated. Further, the other synthesis coefficients K_L and K_R are further calculated according to the depth of field of the non-main objects.

Then, the stereo range image in the left frame 502, the stereo range image in the right frame 503, and the DFD range image are synthesized using the other synthesis coefficients to thereby generate $Z_{MIX\_L}(x, y)$ and $Z_{MIX\_R}(x, y)$ as the right and left intermediate synthesized range images.

The right and left intermediate synthesized range images and the stereo range image in the center frame 501 are further synthesized using the synthesis coefficient K_C to thereby generate a synthesized range image.

According to the above-described third embodiment, it is possible to prevent the number of focal positions for image pickup from being increased and the distance accuracy from being reduced due to the influence of an aperture value of the imaging optical system or a distance measurement range.

Further, in a distance range which is out of the depth of field of a main object and is deep in the depth of field, the synthesized range image is formed using the stereo range image in preference to the DFD range image, and hence it is possible to improve the distance accuracy in such a distance range without increasing the number of focal positions for image pickup.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2012-129865, filed Jun. 7, 2012, which is hereby incorporated by reference herein in its entirety.

What is claimed is:

1. An image processing apparatus comprising:
   an imaging optical unit configured to form at least one object image;
   an image pickup unit configured to pick up at least one object image formed by the imaging optical unit;
   a first generation unit configured to generate a first distance distribution from a first plurality of images having parallax and picked up by the image pickup unit, wherein the first distance distribution is generated by a stereo correspondence point search;
   a second generation unit configured to generate a second distance distribution from a second plurality of images having different degrees of focus at respective corresponding locations therein and picked up by the image pickup unit, wherein the second distance distribution is generated by a depth from defocus;

a detection unit configured to detect a depth of field of an object;

a calculation unit configured to calculate a synthesis coefficient according to the depth of field detected by the detection unit, wherein the synthesis coefficient corresponds to weighting coefficients to be applied to the first distance distribution and the second distance distribution, and wherein the synthesis coefficient corresponding to a weighting coefficient for the first distance distribution increases monotonically as the detected depth of field of the object increases; and a third generation unit configured to generate a synthesized distance distribution by combining the first distance distribution generated by the first generation unit and the second distance distribution generated by the second generation unit based at least on the synthesis coefficient calculated by the calculation unit.

2. The image processing apparatus according to claim 1, wherein the third generation unit is configured to generate, as the synthesized distance distribution, an image in which a value calculated by weighted averaging of respective pixel values of each pixel in the first distance distribution and each pixel in the second distance distribution, which correspond to each other according to location in the first distance distribution and the second distance distribution, is set as a new pixel value, and in the weighted averaging, the synthesis coefficient is the weight coefficient for each pixel value of the first distance distribution.

3. The image processing apparatus according to claim 2, wherein a weight coefficient for each pixel value of the second distance distribution monotonically decreases as the synthesis coefficient increases.

4. The image processing apparatus according to claim 2, wherein the calculation unit is configured to calculate the synthesis coefficient such that values taken within a range of the depth of field are larger than values taken outside the range of the depth of field.

5. The image processing apparatus according to claim 1, wherein the calculation unit is configured to calculate the synthesis coefficient using the depth of field of a main object and a non-main object.

6. The image processing apparatus according to claim 5, wherein the first generation unit is configured to generate another first distance distribution associated with the non-main object, wherein the calculation unit is configured to calculate another synthesis coefficient according to the depth of field of the non-main object, and wherein the third generation unit is configured to generate the synthesized distance distribution by further synthesizing an image generated by synthesizing the another first distance distribution and the second distance distribution using the another synthesis coefficient, and the first distance distribution, using the synthesis coefficient.

7. The image processing apparatus according to claim 1, wherein the depth of field is detected based on an object distance, a focal length, an aperture value, or a diameter of a permissible circle of confusion, which are determined by the imaging optical unit and the image pickup unit.

8. The image processing apparatus according to claim 1, wherein each of the first plurality of images and the second plurality of images picked up by the image pickup unit and having different degrees of focus at respective corresponding locations therein are formed by images which are different in one of a focal position and an aperture value of the imaging optical unit.

9. The image processing apparatus according to claim 1, wherein the synthesized distribution is a range image.

10. The image processing apparatus according to claim 1, wherein detection unit is configured to detect the depth of field of the object based at least on the second plurality of images.

11. A method of controlling an image processing apparatus including an imaging optical unit configured to form an object image, and an image pickup unit configured to pick up an object image formed by the imaging optical unit, the method comprising:

generating a first distance distribution from a first plurality of images having parallax and picked up by the image pickup unit, the first distance distribution being generated by a stereo correspondence point search;

generating a second distance distribution from a second plurality of images having different degrees of focus at respective corresponding locations therein and picked up by the image pickup unit, the second distance distribution being generated by a depth from defocus;

detecting a depth of field of an object;

calculating a synthesis coefficient according to the detected depth of field, the synthesis coefficient corresponding to weighting coefficients to be applied to the first distance distribution and the second distance distribution, the synthesis coefficient corresponding to a weighting coefficient for the first distance distribution increasing monotonically as the detected depth of field of the object increases; and generating a synthesized distance distribution by combining the generated first distance distribution and the generated second distance distribution based at least on the calculated synthesis coefficient.

12. A non-transitory computer-readable storage medium storing a computer-executable program for executing a method of controlling an image processing apparatus including an optical imaging unit configured to form an object image, and an image pickup unit configured to pick up an object image formed by the imaging optical unit, the method comprising:

generating a first distance distribution from a first plurality of images having parallax and picked up by the image pickup unit, the first distance distribution being generated by a stereo correspondence point search;

generating a second distance distribution from a second plurality of images having different degrees of focus at respective corresponding locations therein and picked up by the image pickup unit, the second distance distribution being generated by a depth from defocus;

detecting a depth of field of an object;

calculating a synthesis coefficient according to the detected depth of field, the synthesis coefficient corresponding to weighting coefficients to be applied to the first distance distribution and the second distance distribution, the synthesis coefficient corresponding to a weighting coefficient for the first distance distribution increasing monotonically as the detected depth of field of the object increases; and generating a synthesized distance distribution by combining the generated first distance distribution and the generated second distance distribution based at least on the calculated synthesis coefficient.

13. An image processing apparatus comprising:
an imaging optical unit configured to form at least one object image;
an image pickup unit configured to pick up a first plurality of object images having parallax at first respective corresponding locations therein and a second plurality of object images having different degrees of focus at second respective corresponding locations therein, wherein the first and second plurality of object images are formed by the imaging optical unit;
a first generation unit configured to generate a first distance distribution from the first plurality of object images by stereo correspondence point search;
a second generation unit configured to generate a second distance distribution from the second plurality of object images by a depth from defocus;
a calculation unit configured to calculate a synthesis coefficient according to the depth of field of a non-main object, different from a main object, selected from a plurality of objects shown in the at least one object image, wherein the synthesis coefficient corresponds to weighting coefficients to be applied to the first distance distribution and the second distance distribution, and wherein the synthesis coefficient corresponding to the weighting coefficient for the first distance distribution increases monotonically as the detected depth of field of the non-main object increases; and
a third generation unit configured to generate a synthesized distance distribution by combining the first distance distribution generated by the first generation unit and the second distance distribution generated by the second generation unit based at least on the synthesis coefficient calculated by the calculation unit.

14. The image processing apparatus according to claim 13,
wherein the third generation unit is configured to generate, as the synthesized distance distribution, an image in which a value calculated by weighted averaging of respective pixel values of each pixel in the first distance distribution and each pixel in the second distance distribution, which correspond to each other according to location in the first distance distribution and the second distance distribution, is set as a new pixel value, and in the weighted averaging, the synthesis coefficient is the weight coefficient for each pixel value of the first distance distribution.

15. The image processing apparatus according to claim 14, wherein a weight coefficient for each pixel value of the second distance distribution monotonically decreases as the synthesis coefficient increases.

16. The image processing apparatus according to claim 14, wherein the calculation unit is configured to calculate the synthesis coefficient such that values taken within a range of the depth of field are larger than values taken outside the range of the depth of field.

17. The image processing apparatus according to claim 13, wherein the calculation unit is configured to calculate the synthesis coefficient using the depth of field of the main object and the non-main object.

18. The image processing apparatus according to claim 17, wherein the first generation unit is configured to generate another first distance distribution associated with the main object,
wherein the calculation unit is configured to calculate another synthesis coefficient according to the depth of field of the main object, and
wherein the third generation unit is configured to generate the synthesized distance distribution by further synthesizing an image generated by synthesizing the another first distance distribution and the second distance distribution using the another synthesis coefficient, and the first distance distribution, using the synthesis coefficient.

19. The image processing apparatus according to claim 13, wherein the depth of field is detected based on an object distance, a focal length, an aperture value, or a diameter of a permissible circle of confusion, which are determined by the imaging optical unit and the image pickup unit.

20. The image processing apparatus according to claim 13, wherein each of the first plurality of images and the second plurality of images picked up by the image pickup unit and having different degrees of focus at respective corresponding locations therein are formed by images which are different in one of a focal position and an aperture value of the imaging optical unit.

* * * * *